United States Patent [19]

Itoh et al.

[11] Patent Number: 5,696,933

[45] Date of Patent: Dec. 9, 1997

[54] APPARATUS FOR CONTROLLING DATA WRITING INTO A DISK ARRAY SYSTEM INCLUDING A DATA LENGTH DETECTING UNIT AND A WRITING MODE SELECTOR

[75] Inventors: Mikio Itoh; Tomoyuki Suganuma; Suijin Takeda; Hirofumi Morita, all of Kawasaki, Japan

[73] Assignee: Fujitsu Limited, Kawasaki, Japan

[21] Appl. No.: 633,090

[22] Filed: Apr. 16, 1996

Related U.S. Application Data

[62] Division of Ser. No. 133,441, Oct. 6, 1993.

[30] Foreign Application Priority Data

| Oct. 8, 1992 | [JP] | Japan | 4-269822 |
| Oct. 8, 1992 | [JP] | Japan | 4-269825 |
| Oct. 8, 1992 | [JP] | Japan | 4-269827 |

[51] Int. Cl.⁶ .................................. G06F 12/02
[52] U.S. Cl. ........................... 395/441; 395/482
[58] Field of Search ........................ 395/439, 441, 395/440, 182.04, 482, 495, 497.02, 497.04

[56] References Cited

U.S. PATENT DOCUMENTS

| 5,088,081 | 2/1992 | Farr | 369/54 |
| 5,148,432 | 9/1992 | Gordon et al. | 371/10.1 |
| 5,166,936 | 11/1992 | Ewert et al. | 371/21.6 |
| 5,182,808 | 1/1993 | Bagnoli et al. | 395/725 |
| 5,278,838 | 1/1994 | Ng et al. | 371/10.1 |
| 5,303,244 | 4/1994 | Watson | 371/10.1 |
| 5,315,602 | 5/1994 | Noya et al. | 371/40.4 |
| 5,345,565 | 9/1994 | Jibbe et al. | 395/325 |
| 5,375,217 | 12/1994 | Jibbe et al. | 395/425 |
| 5,379,417 | 1/1995 | Lui et al. | 395/575 |
| 5,404,487 | 4/1995 | Murata et al. | 395/425 |
| 5,454,085 | 9/1995 | Gajjar et al. | 395/285 |
| 5,519,844 | 5/1996 | Stallmo | 395/441 |
| 5,572,699 | 11/1996 | Kamo et al. | 395/441 |

FOREIGN PATENT DOCUMENTS

| 4023119 | 1/1992 | Japan |
| 4188463 | 7/1992 | Japan |
| 4279924 | 10/1992 | Japan |
| 4370823 | 12/1992 | Japan |
| 5006624 | 1/1993 | Japan |

OTHER PUBLICATIONS

Paterson, et al., A Case for Redundant Arrays of Inexpensive Disks (RAID), 1988, pp. 109–116.

Primary Examiner—Eddie P. Chan
Assistant Examiner—Hiep T. Nguyen
Attorney, Agent, or Firm—Greer, Burns & Crain, Ltd.

[57] ABSTRACT

When an amount of write data instructed by an upper-level system is small, a plurality of disk units are accessed individually and data split in sectors is written therein (Level 5 RAID). When an amount of write data instructed by the upper-level system is large, the plurality of disk units are accessed in parallel and data split in sectors is written therein (Level 3 RAID). When a disk unit in an array, to which a setup instruction is issued according to a processing request sent from the upper-level system, returns a fault reply, an ID management table is used to allocate an auxiliary disk instead of the failing disk unit. After the allocation, data is restored to the replacement disk using the data in normal disk units in the same rank. In a dual-port access configuration, when two transactions access disk units connected to the same port, a deadlock may occur depending on the access procedure. It is checked if the conditions for a deadlock are established, so that access will be obtained according to a procedure for preventing or avoiding a deadlock.

16 Claims, 40 Drawing Sheets

FIG. 13

| a | | | | b | | | | c | | | | d | | | |
|---|---|---|---|---|---|---|---|---|---|---|---|---|---|---|---|
| a1 | a2 | a3 | a4 | b1 | b2 | b3 | b4 | c1 | c2 | c3 | c4 | d1 | d2 | d3 | d4 |

NEW PARITY DATA = OLD DATA (+) OLD PARITY DATA (+) NEW DATA

| NEW PARITY DATA | = | OLD DATA | (+) | OLD PARITY DATA | (+) | NEW DATA |

FIG. 24

| DEVICE NUMBER | LOGICAL ID | PHYSICAL ID |
|---|---|---|
| 01 | 0101 | 0101 |
| 07 | 0107 | 0107 |
| 02 | 0202 | 0202 |
| 08 | 0208 | 0208 |
| 03 | 0303 | 0303 |
| 09 | 0309 | 0309 |
| 04 | 0404 | 0404 |
| 10 | 0410 | 0410 |
| 05 | 0505 | 0505 |
| 11 | 0511 | 0511 |
| 06 (AUXILIARY) | 0606 | 0606 |
| 12 (AUXILIARY) | 0612 | 0612 |

FAILURE → (pointing to row 09)

FIG. 25

| DEVICE NUMBER | LOGICAL ID | PHYSICAL ID |
|---|---|---|
| 01 | 0101 | 0101 |
| 07 | 0107 | 0107 |
| 02 | 0202 | 0202 |
| 08 | 0208 | 0208 |
| 03 | 0303 | 0303 |
| 09 (AUXILIARY) | 0309 | 0612 |
| 04 | 0404 | 0404 |
| 10 | 0410 | 0410 |
| 05 | 0505 | 0505 |
| 11 | 0511 | 0511 |
| 06 | 0606 | 0606 |
| 12 (AUXILIARY) | 0612 | 0309 |

FIG. 30

| TRANSACTION NUMBER | PARITY STORAGE DISK | | DATA STORAGE DISK | |
|---|---|---|---|---|
| | NUMBER | STATE OF ACCESS | NUMBER | STATE OF ACCESS |
| PREVIOUS TRANSACTION | 3201 | WRITE-IN-PROGRESS | 3204 | WRITE-COMPLETED |
| PREVIOUS TRANSACTION | 3220 | WRITE-IN-PROGRESS | 3217 | WRITE-COMPLETED |
| 1 | 3207 | WAITING | 3209 | WAITING |
| 2 | 3209 | WAITING | 3207 | WAITING |

APPARATUS FOR CONTROLLING DATA WRITING INTO A DISK ARRAY SYSTEM INCLUDING A DATA LENGTH DETECTING UNIT AND A WRITING MODE SELECTOR

This is a divisional of copending application Ser. No. 08/133,441 filed on Oct. 6, 1993.

BACKGROUND OF THE INVENTION

1. Field of the Invention

The present invention relates to a disk array system capable of accessing a plurality of disk units in parallel to input or output data. More particularly, this invention is concerned with a disk array system aiming to improve the processing performance of a write operation and preventing a deadlock from occurring when an auxiliary disk unit is allocated in case of a fault or a dual-port configuration is adopted.

2. Description of the Related Art

Disk units, characterized by nonvolatility in retaining stored data, a large storage capacity, and a high data transfer rate; such as, a magnetic disk and an optical disk unit have been widely adopted as external storages for computer systems. Demands for the disk unit are a high data transfer rate, excellent reliability, a large storage capacity, and inexpensiveness. A disk array system is gaining popularity because of its capacity for coping with the above demands. In the disk array system, several compact disks are arranged in an array, data is distributed to and recorded in the multiple disk units, and then accessed in parallel.

When the disk array system transfers data to or from multiple disk units in parallel, the data transfer, rate is a product of the number of disk units or much higher than that permitted by a single disk unit. When data is recorded with redundant information such as parity bits appended, a data error caused by the failure of a disk unit can be detected and corrected. This results in high reliability that is of the same level as that permitted by a duplex system, in which the contents of a disk unit are duplicated and recorded, with lower cost.

In the past, David A. Patterson et al., University of California at Berkeley, have published a thesis in which disk array systems, each of which accesses many disk units to transfer a large amount of data at a high rate and has data redundancy against a disk unit failure, are classified into levels 1 to 5 for evaluation (ACM SIGMOD Conference. Chicago. Ill. Jun. 1–3, 1988. P.109–116). That is to say, David A. Patterson et al. have classified redundant arrays of inexpensive disk units (RAID) into Levels 1 to 5. Levels 1 to 5 RAID will be described briefly below.

[Level 0 RAID]

FIG. 1 shows a disk array system that has no data redundancy. David A. Patterson has not set a classification of Level 0 RAID. The disk array system shown in FIG. 1 shall be referred to as Level 0 RAID. As apparent from the illustration of data(data block), A to I, a disk array control unit 10 merely distributes data into disk units 32-1 to 32-3 according to input and output requests sent from a host computer 18. The disk array system does not have data redundancy against a disk unit failure.

[Level 1 RAID]

A disk array system classified as Level 1 RAID includes, as shown in FIG. 2, a mirrored disk unit 32-2 that contains copies A' to D' of data A to D existent in a disk unit 32-1. The disk array system classified as Level 1 RAID has been widely adopted despite the low use efficiency of a disk unit, because of its redundancy and availability with simple control.

[Level 2 RAID]

A disk array system classified as Level 2 RAID stripes (splits) data in bits or bytes and reads or writes the data from or to disk units in parallel. The striped data is recorded in physically the same sectors of the disk units. A hamming code produced using data is employed as an error-correcting code. Aside from the data disk units, a disk unit is assigned for the purpose of recording hamming codes. The hamming codes are checked to specify a failing disk unit, and then data is restored. Thanks to the redundancy provided by the hamming code, even if a disk unit fails, correct data is preserved. Nevertheless, the poor use efficiency of a disk unit has deterred the practical application of the second level RAID system.

[Level 3 RAID]

A disk array system classified as Level 3 RAID has the configuration shown in FIG. 3. Specifically, as shown in FIG. 4, data a, b, and c are split in bits or sectors into data a1 to a3, b1 to b3, and c1 to c3 respectively. A parity data P1 is produced by calculating the data a1 to a3, a parity data P2 is produced by calculating the data b1 to b3, and a parity data P3 is produced by calculating the data c1 to c3. These data and parity data are written in disk units 32-1 to 32-4 in FIG. 3 which are accessed concurrently.

In the third level RAID system, data redundancy is ensured by parity data. Parallel processing of split data enables a reduction in a data write time. However, each access for writing or reading data requires all the of disk units 32-1 to 32-4 to be accessed in parallel. When a large amount of data is handled continuously, the third level RAID system is effective. However, when a small amount of data is accessed at random transaction processing, for example the advantage of a high data transfer rate is not present, and efficiency is deteriorated.

[Level 4 RAID]

A disk array system classified as Level 4 RAID splits one data in sectors and writes the split data in the same disk unit as shown in FIG. 5. In the disk unit 32-1, for example, sector data a1 to a4 are written as data a. Parity data is stored in the disk unit 32-4 that is defined as a dedicated disk unit. The parity data P1 is produced by calculating the data a1, b1, and c1. The parity data P2 is produced by calculating the data a2, b2, and c2. The parity data P3 is produced by calculating the data a3, b3, and c3. The parity data P4 is produced by calculating the data a4, b4, and c4.

Data read can be executed in parallel for the disk units 32-1 to 32-3. Assuming that the data a is to be read, sectors 0 to 3 in the disk unit 32-1 are accessed to read sector data a1 to a4 sequentially. The sector data is then synthesized. In a data write operation, data and a parity data are read first, and then a new parity data is produced. Thereafter, writing is performed. For writing data once, access must therefore be obtained four times. For example, when the sector data a1 in the disk unit 32-1 is to be updated (rewritten), the old data (a1)old in the update area and the old parity data (P1)old in the associated area in the disk unit 32-4 must be read out. A new parity data (P1)new is then produced in conformity with new data (a1)new, and then written. This write operation is needed in addition to data write for update. Writing always involves access to the parity disk unit 32-4. Write cannot therefore be executed for multiple disk units simultaneously. For example, even when an attempt is made to write the data a1 in the disk unit 32-1 and the data b2 in the disk-unit 32-2 simultaneously, since the parity data P1 and P2 must be read from the disk unit 32-4 and new parity data must be produced and written, the data cannot be written in the disk units simultaneously. Level 4 RAID is defined as described above, which offers little merit. A move has seldom been made to put the fourth level RAID system to practical use.

[Level 5 RAID]

A disk array system classified as Level 5 RAID has no disk unit dedicated to storage of parity data, whereby parallel reading or writing is enabled. A parity data is placed, as shown in FIG. 6, in a different disk unit for each sector. The parity data P1 is produced by calculating the data a1, b1, and c1. The parity data P2 is produced by calculating the data a2, b2, and d2. The parity data P3 is produced by calculating the data a3, c3, and d3. The parity data P4 is produced by calculating the data b4, c4, and d4.

As for parallel reading or writing, since the parity data P1 and P2 are placed in different disk units; the disk units 32-4 and 32-3, contention does not occur, and the data a1 in the sector 0 in the disk unit 32-1 and the data b2 in the sector 1 in the disk unit 32-2 can be read or written simultaneously. An overhead operation that requires write assess to be obtained four times is identical to that in Level 4 RAID. In Level 5 RAID, multiple disk units can be accessed asynchronously to execute read or write operations. The fifth level RAID system is therefore desirable for transaction processing in which a small amount of data is accessed at random.

In Level 4 or 5 RAID, parity-data production done in the course of data write will be described below. In a disk array system containing redundant information (redundant data block), data blocks existent in corresponding storage locations in multiple disk units are exclusive-ORed according to the expression (1). A parity data is thus produced, and then placed in a parity-data storage disk unit.

$$\text{Data } a \ (+) \ \text{data } b \ (+) \ldots = \text{Parity data } P \tag{1}$$

where, (+) denotes exclusive OR.

In Level 4 RAID, the save area of parity data is fixed to a specific disk unit or the disk unit 32-4 in FIG. 5. In Level 5 RAID, as shown in FIG. 6, parity data is distributed to the disk units 32-1 to 32-4. This eliminates the congestion of access to a specific disk unit resulting from parity-data read or write. As for the data read in Level 4 or 5 RAID, since the data in the disk units 32-1 to 32-4 are not rewritten, the consistency of a parity data is maintained. For data writing, however, a parity data must be changed according to data. For example, when the old data (a1)old in the disk unit 32-1 is rewritten into new data (a1)new, the parity data P1 must be updated according to the expression (2). Thus, the parity data can remain consistent with the whole of the data in disk units.

$$\text{Old data } (+) \ \text{Old parity data } (+) \ \text{New data} = \text{New parity data} \tag{2}$$

However, in a conventional disk array system classified as Level 4 or 5 RAID, as apparent from the expression (2), when data write is executed, old data is read from a write object disk, a parity data is read from an area in a parity-data storage disk unit corresponding to the write-scheduled area, and then a new parity data is worked out. Thereafter, new data and the new parity data are written in the respective disk units. For writing data once, reading and writing must be performed twice respectively. In other words, access must be obtained four times. This leads to the prolonged processing time. The improved performance cannot be expected from the disk array system.

In the disk array system classified as Level 3 RAID, which is shown in FIG. 3, data is split in the direction in which disk units are lined up (i.e across the disk units) and written in the disks in parallel. It is therefore unnecessary to read old data and an old parity data from disk units. A new parity data can be produced by calculating split data. Compared with Level 4 or 5 RAID, Level 3 RAID therefore offers a shorter read time. In Level 3 RAID, however, all disk units must be accessed in parallel for writing. Level 3 RAID is therefore undesirable for transaction processing in which disk units must be read or written individually to handle a large amount of data.

In a disk array system having data redundancy, k disk units for storing data, and m disk units for storing redundant information relevant to stored data; such as, parity data is integrated into a disk array. The k+m disk units in the disk array configuration made up of data storage disk units and parity-data storage disk units is generally referred to as a rank. To prevent a system from stopping due to a failure in a disk unit in a rank, at least one auxiliary disk unit must be included in the rank. If any of data storage and parity-bit storage disk units, which are included in a rank of a disk array, fails, an auxiliary disk unit is allocated instead of the failing disk. After the allocation, the associated data and a parity data is read from the data storage and parity-data storage disk units, and, for example, exclusive-ORed. The data stored in the failing disk unit can thus be restored and saved in the auxiliary disk unit. The failing disk unit is replaced with a new one by a maintenance engineer. After the replacement, the data saved in the auxiliary disk is restored to the original repaired disk.

However, in the foregoing conventional disk array system, an auxiliary disk unit is fixed. If a disk unit is recovered from a failure, restored data must be returned to the auxiliary disk that has been allocated to the data temporarily, and having the restored data. It is time-consuming to restore the data in a failing disk.

In a disk array system made up of multiple ranks, if an access path to each disk unit has a dual-port structure, the present inventors have discovered that a deadlock may occur during disk writing.

Applicants have discovered why a deadlock occurs during writing in, for example, Level 5 RAID, and such discovery will be described below. In Level 5 RAID, the exclusive-OR of data and a parity data in disk units is calculated according to the expression (1) to produce a parity data which is then saved in a disk unit.

$$\text{Data } a \ (+) \ \text{Data } b \ (+) \ldots = \text{Parity data P1} \tag{1}$$

where, (+) denotes exclusive OR.

As for the save areas of data and parity data, as shown in FIG. 6, the parity data P1 to P4 are distributed to the disk units 32-1 to 32-4 so as to prevent the congestion of access to a single disk unit resulting from parity-data read or write (parity-data update). When it comes to the data read in Level 5 RAID, since data in disks are not rewritten, the consistency of a parity data is maintained. For writing, however, a parity data must be changed in conformity with data.

During data updating during which old data in a certain disk unit is rewritten into new data, the calculation based on the expression (2) must be performed to update the parity data so that the parity data will be consistent with the new data. Thus, the parity data remains consistent with the whole of the data in disk units.

$$\text{Old data } (+) \ \text{Old parity data } (+) \ \text{New data} = \text{New parity data} \tag{2}$$

As apparent from the expression (2), data write requires reading old data and an old parity data from disk units. Since data is written in an area from which old data is read, before write is executed for a disk, a disk unit must be rotated by one turn. This is time-consuming. For writing a parity data, a new parity data must be produced according to the expression (2). Parity-data write must therefore be place in the wait state until old data is read from a disk unit in which data is to be written.

The flowchart of FIG. 7 shows the processing operations done by a disk array system of the fifth RAID level. In FIG. 7, the processing operations done by a data storage disk unit and a parity-data storage disk unit, which are associated with the processing done by a disk array control unit, are shown side by side.

Next, applicants' discovery of why a deadlock occurs will be described. Described first is how a disk array system having a single-port configuration acts in response to two write requests (transactions) sent from a host computer. FIG. 8 shows a disk array system including four disk arrays 46 or ranks and having a single-port configuration that is defined With only one disk array control unit 10. Specifically, the disk array system comprises disk units 32-1 to 32-20, interfaces 234-1 to 234-5, and ranks 48-1 to 48-4 each of which is regarded as an array unit.

Assuming that the two disk units 32-4 and 32-17, which are hatched in FIG. 8, are in use, a transaction 1 is submitted as an update instruction, which is intended to update data D1 in the disk unit 32-9 and a parity data P1 in the disk 32-7, to the disk array control unit 10. Immediately after the transaction 1, a transaction 2 is submitted as an update instruction which is intended to update data D2 in the disk unit 32-7 and a parity data P2 in the disk unit 32-9. The disk units 32-4 and 32-17, and the interfaces 234-2 and 234-4 are in use. Until the disk units are released the instructions of the transactions 1 and 2 are placed in a queue. When the disk units 32-4 and 32-17 are released the transaction 1 is granted the use authorities of the disk units 32-7 and 32-9 via the interfaces 234-2 and 234-4.

With the D1 update instruction of the transaction 1, the old data D1 is read from the disk 32-9, new data D1 is written therein, and then the disk unit 32-9 is released. With the P1 update instruction of the transaction 1, the old parity data P1 is read from the disk unit 32-7. In this state, when reading the old data D1 is completed, a new parity data P1 is produced according to the expression (2). The new parity data P1 is then written in the disk unit 32-7. Thereafter, the disk unit 32-7 is released. The transaction 1 accesses the disk units 32-7 and 32-9 concurrently. After the processing of the transaction 1 is completed, the D2 update instruction and P2 update instruction of the transaction 2 are handled similarly. In the single-port configuration, the succeeding transaction 2 will never use disk units before the preceding transaction. A deadlock will therefore never occur.

FIG. 9 shows a disk array system having a dual-port configuration. Two disk array control units 10-1 and 10-2 are included. Interfaces 234-1 to 234-5 and 236-1-to 236-5 serve as two-system access paths. Compared with the single-port configuration in FIG. 8, the dual-port configuration offers a double throughput in theory. When contention occurs because access requests are made for the same disk unit by the disk array control units 10-1 and 10-2, either of the control units that succeeds in obtaining the use authority is enabled to use the disk unit exclusively, while the other control unit waits until the disk is released at the termination of the previous access.

A deadlock occurring in the dual-port configuration in FIG. 9 will be described below. Supposedly, the disk array control unit 10-1 is using the disk unit 32-4 and the disk array control unit 10-2 is using the disk unit 32-17. The transaction 1 is submitted to the disk array control unit 10-1, and the transaction 2 is submitted to the disk array control unit 10-2 immediately after the transaction 1. The preceding transaction 1 has a D1 update instruction for updating the data D1 in the disk unit 32-9 and also has a P1 update instruction for updating the parity data P1 in the disk unit 32-7. The transaction 1 is placed in a queue. The succeeding transaction 2 has a D2 update instruction for updating the data D2 in the disk unit 32-7 and also has a P2 update instruction for updating the parity P2 in the disk unit 3-29, which is also placed in a queue.

Since the interface 234-2 for interfacing the disk array control unit 10-2 with the disk unit 32-9 is available, the use authority of the disk 32-7 can be obtained with the P1 update instruction and the parity data P1 can be read immediately. Since the interface 234-4 for interfacing the disk array control unit 10-2 with the disk unit 32-9 is also available, the use authority of the disk unit 32-9 can be obtained with the P2 update instruction and the parity data P2 can be read immediately. After reading the parity data P1 and P2 is completed, the transactions 1 and 2 retains the exclusive use of the disk units 32-7 and 32-9 respectively in order to write new parity data. The state shown in FIG. 10 is thus set up.

Using the D1 and D2 update instructions, the transactions 1 and 2 attempt to read the old data D1 and D2, which have not been updated, and produce new parity data. However, even when the transaction 1 attempts to access the disk unit 32-9 for the D1 update instruction, since the transaction 2 is using the disk unit 32-9 exclusively for the P2 update instruction, the transaction 1 fails to access. Even when the transaction 2 attempts to access the disk unit 32-7 for the D2 update instruction, since the transaction 1 is using the disk exclusively for the P1 update instruction, the transaction 2 fails to access. In other words, the transactions 1 and 2 use disk units exclusively to update parity data, generate use requests in order to use the disk units the partners are currently using exclusively, and wait for the partners to terminate. An event that both the disk units are not released to suspend processing; that is, a deadlock may therefore occurs. In short, when interrupt-disabled disk units, each of which is used handle one job at a time, are placed in a cyclic wait state, a deadlock occurs.

SUMMARY OF THE INVENTION

The present invention provides a disk array system that selects an optimal access mode depending on an amount of data sent from an upper-level system and performs writing.

The disk array system of the present invention includes a disk array made up of multiple disk units for storing data and parity data. When an amount of write data(length of write data block) instructed by an upper-level system is small, a first writer accesses multiple disk units individually, and writes data split in units of a specified length, for example, a sector. When an amount of write data instructed by the upper-level system is large, a second writer accesses the multiple disk units in parallel and writes data split in sectors.

The first writer performs writing in an individual access mode. In the individual write mode, before data is written, data is read from a write-scheduled area in a write object disk unit or a disk to be subjected to writing, a parity data provided as redundant information is read from an area in other disk corresponding to the write-scheduled area, and then new redundant information is produced by performing an exclusive-OR operation. The data storage disk unit and parity-data storage disk unit are accessed individually and written asynchronously.

The second writer performs writing in a parallel access mode. Multiple sector data, which are saved in parallel in the direction in which disk units are lined up, are exclusive-ORed to produce a new parity data serving as new redundant information. Thereafter, multiple disk units are accessed in parallel and multiple sector data and the parity data is written asynchronously therein. When a large amount of data are to be handled, the second writer checks if all disk units are accessible before starting writing in the parallel access mode. If all the multiple disk units are inaccessible, a parity data is produced in the parallel access mode according to the data storage form for the individual access mode. The disk units are then accessed individually, and sector data and the parity data are written therein. If all the multiple disk units are accessible, a parity data is produced in the parallel access mode. Sector data and the parity data are then written in parallel in the multiple disk units. The save area in which parity data are saved in the individual access mode may be distributed to disk units or fixed to a specific disk.

The foregoing disk array system of the present invention checks an amount of data whose writing is instructed by an upper-level system. In principle, if an amount of data is small, the individual access mode is selected. This is because in the individual access mode, transaction processing to be performed after writing can be carried out efficiently, though a write time is long. If an amount of data is large, the parallel access mode permitting a short write time is selected for transaction processing. The individual access mode corresponds to the fifth (or fourth) level RAID organization. The parallel access mode corresponds to the third level RAID organization. The present invention thus permits efficient data writing by exerting the effects of both Level 5 (or 4) and 3 RAIDs depending on an amount of data. After a large amount of data is written in the parallel access mode corresponding to the third level RAID organization, stored data is read in the parallel access mode during the idle time of the disk array system, and then the data is rewritten in the individual access mode. Thus, disk units can be read or written individually for transaction processing.

As mentioned above, a disk array control unit checks an amount of data specified in an input or output request sent from an upper-level system, and selects a disk unit access mode. This leads to the improved accessibility, reduced processing time, and upgraded data transfer rate. The performance for coping with an input or output request has thus improved.

Furthermore, the present invention provides a disk array system capable of efficiently restoring data in a failing disk unit. The disk array system of the present invention includes a disk array made up of multiple disk units for storing data, one disk unit for storing redundant information such as parity data, and at least one auxiliary disk unit that is on standby. Each of the disk units included in the disk array is subjected to the control of a disk unit allocator, an ID management table, an access processor, an allocation changer, and a data restorer, all of which are installed in a disk array control unit. The ID management table specifies logical IDs, with which an upper-level system designates disk units to be accessed, in one-to-one correspondence with physical IDs assigned to the disk units. The disk allocator references the ID management table in response to a processing request sent from the upper-level system, allocates one or multiple disk units as a processing object or processing objects, and requests the allocated disk unit or disk units to set up. When a disk unit returns a ready reply for the setup request sent from the disk unit allocator, the access processor is activated to execute read or write according to the processing request sent from the upper-level system.

When the disk unit returns a fault reply for the setup request sent from the disk unit allocator, the allocation changer replaces the physical ID of the faulty disk unit with the physical ID of a currently auxiliary disk unit in the ID management table, and allocates the auxiliary disk unit instead of the failing disk. The data restorer restores data, which is the same as the data stored in the failing disk unit, to the auxiliary disk unit allocated instead of the failing disk unit. The restoration restores data in a auxiliary disk, which is allocated instead of a failing disk unit, by calculating the exclusive-OR of data and parity data read from all the disk units in the disk array except the failing disk unit.

Furthermore, the data restorer manages address pointers, each of which points to an area in an auxiliary disk unit, which is allocated instead of a failing disk, to be subjected to data restoration. When data restoration is in progress, if an upper-level system issues an access request, the value of an address pointer pointing to the requested address is compared with the one of an address pointer pointing to a data restoration area. If the requested address indicates a restored area, the access processor is enabled to execute read or write.

According to the aforesaid disk array system of the present invention, if a data storage or parity-data storage disk unit included in a disk array fails, an auxiliary disk unit is allocated instead of the failing disk unit and data is restored. Thereafter, the auxiliary disk unit is operated as an original data storage disk unit. When a failing disk unit is replaced with a new one or installed after repaired, the disk unit is assigned to an auxiliary disk unit.

When a failure is recovered, data need not be returned from an auxiliary disk. When data restoration for an auxiliary disk unit terminates, normal processing can be restarted. When data is being restored to an auxiliary disk unit allocated instead of a failing disk, an access request may be received. In this case, when the requested data area is a restored data area, restoration is suspended and a processing request is handled. Even if data restoration is in progress, restored data can be accessed as usual. The deterioration in processing performance resulting from data restoration is thus minimized.

Furthermore, the present invention provides a disk array system whose disk array configuration is a multirank dual-port configuration, enables individual access to disk units included in a rank, and has parity data distributed, and that can avoid a deadlock. The disk array system is based on a disk array made up of multiple ranks (array units) each of which comprises multiple disk units containing multiple data and parity data serving as redundant information, which are to be processed in parallel. A parity data stored in each disk unit in the disk array is produced according to a data storage form and a parity-data production form, which are equivalent to those defined in Level 5 RAID: a parity data is stored in a different disk unit for each data storage location. At east two disk array control units are included in the disk array system, which realizes a dual-port configuration having two access paths over which disk units 32 are accessed individually to read or write data or parity data.

According to the present invention, in a disk array system equivalent to the fifth level RAID system in which a multi-rank dual-port configuration is realized and parity-data storage disk units are distributed, a deadlock suppressor is included to prevent a deadlock from occurring when transactions 1 and 2 serving as two processing requests, which intend to access two disk units connected to the same port, are issued one after another by two disk array control units.

A deadlock may occur under the conditions that two disk array processors are handling transactions 1 and 2 that are issued one after another, the transaction 1 updates data D1 in one disk, the transaction 2 updates a parity data P2 in another disk unit, the transaction 2 attempts to update a parity data P1 in one disk, and the transaction 1 attempts to update data D2 in another disk unit. When the conditions for occurrence of a deadlock are established, if the transactions 1 and 2 attempt to update parity data first, a deadlock occurs. For avoiding a deadlock, parity-data update must not precede data update. Alternatively, when parity-data update precedes data update, if disk units are released at the completion of parity-bit read, a deadlock can be avoided. The deadlock suppressor operates case by case. Cases 1 to 5 are presented below.

[Case 1]

Reading old data D1 and D2 and old parity data P1 and P2 is performed separately from writing new parities. When reading an old parity data P1 or P2 is completed, the parity data storage disk unit is released so that the partner transaction can update data D1 or D2. When updating the data D1 or D2 is completed, since the old data D1 or D2 has already been read, a new parity data P1 or P2 can be produced. Thereafter, the parity-data storage disk unit is accessed again and the new parity data is written therein.

[Case 2]

A data storage disk unit and a parity-data storage disk unit are not accessed concurrently. A procedure is defined so that unless access to a data storage disk unit is completed, access to a parity-data storage disk unit is not enabled.

[Case 3]

When the preceding transaction 1 completes reading an old parity data P1, the deadlock suppressor references the progress of access to a data storage disk. Depending on the progress level, the deadlock suppressor allows the transaction 1 to keep using a disk unit exclusively or releases it.

I. When a data storage disk unit is accessed; that is, when the old data D1 or D2 is sought for, being buffered, or have been buffered, after a short time elapses, data update is executed to read the old data, a new parity data is produced and written, and then the disk unit is released. The transaction 1 is allowed to keep using the disk unit exclusively until parity-data update is completed.

II. When the transaction 1 fails to access a data storage disk unit and enters a queue, the deadlock suppressor determines if the conditions for occurrence of a deadlock are established. If the conditions are established, the parity-data storage disk unit used exclusively by the succeeding transaction 2 is released, and the preceding transaction 1 is allowed to execute data update first.

[Case 4]

Before the succeeding transaction 2 accesses a parity data storage disk, the deadlock suppressor determines if the conditions for occurrence of a deadlock are established. If the conditions are established, the deadlock suppressor references the progress of access to a data storage disk unit made by the preceding transaction 1. Until access to the data storage disk unit is started, the deadlock suppressor disables the succeeding transaction 1 from accessing the parity-data storage disk.

[Case 5]

Before submitted to two disk array control units, all transactions are placed in a first-in first-out queue in the order that they are generated. The transactions are then submitted to the two disk array control units sequentially and executed thereby. An access request for a disk unit issued by a succeeding transaction will never be handled before an access request for a disk unit issued by a preceding transaction. A deadlock will therefore not occur.

The aforesaid disk array system of the present invention has a so-called fifth level RAID configuration, wherein disk units included in a disk array can be read or written individually and a parity data is stored in a different area for each location of stored data. When a multi-rank dual-port configuration is adopted, a deadlock that occurs under specific conditions is predicted and conditions not permitting a deadlock are established. A deadlock is thus avoided reliably. When the system enters a deadlock state, if disk units are released forcibly, a deadlock can be avoided quickly or the system can be recovered from the deadlock state quickly.

The above and other objects, and advantages of the present invention will be more apparent from the detailed description below with reference to the drawings.

BRIEF DESCRIPTION OF THE DRAWINGS

FIG. 13 is an explanatory diagram showing write data split in sectors according to the present invention;

FIG. 24 is an explanatory diagram showing a device ID management table that has not been modified;

FIG. 25 is an explanatory diagram showing the device ID management table that has been modified because of occurrence of a fault;

FIG. 30 is an explanatory diagram showing the states in transactions are submitted to cause a deadlock;

DETAILED DESCRIPTION OF THE PREFERRED EMBODIMENTS

Access to a Disk Array depending on an Amount of Data

Figure 11:
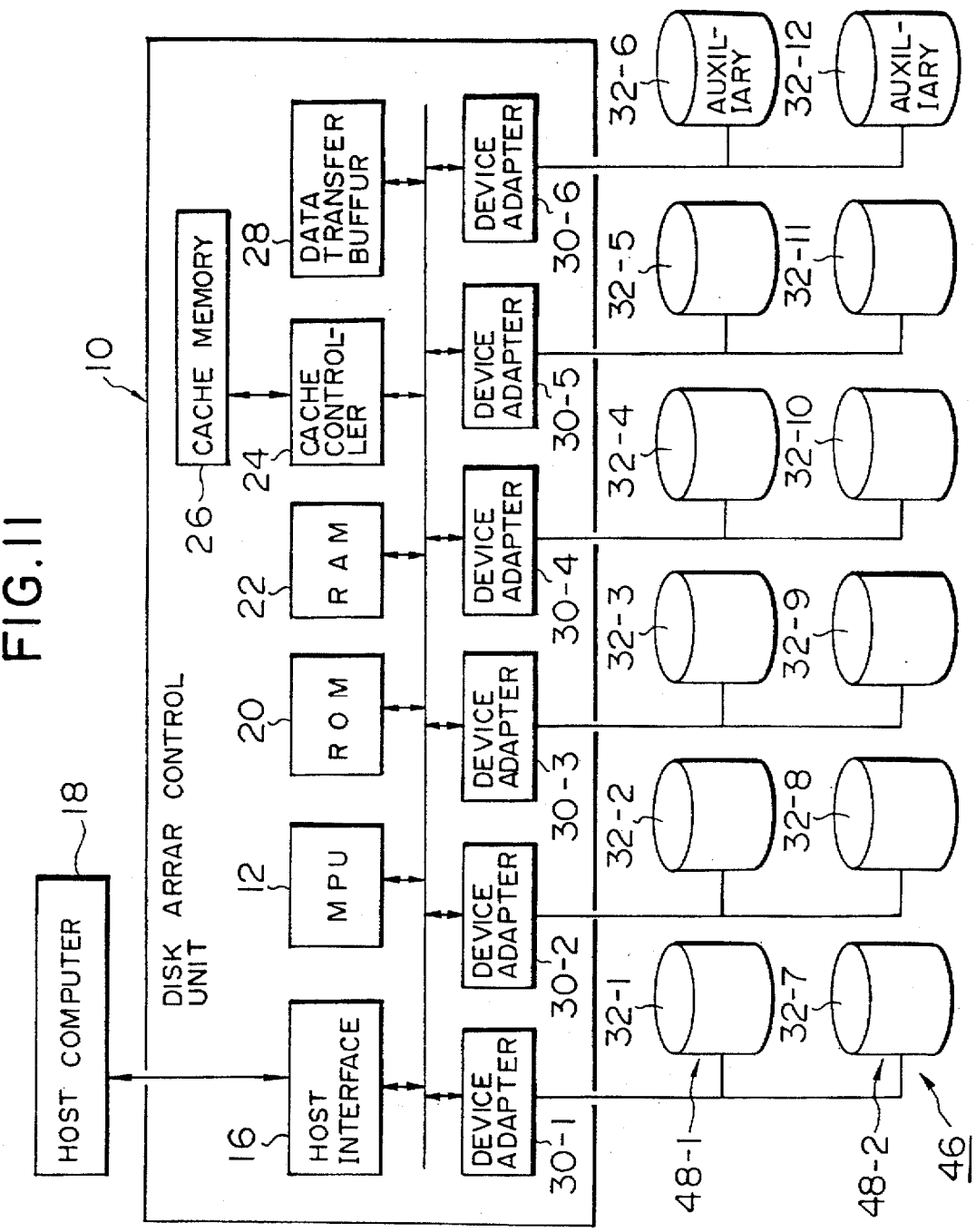
FIG. 11 is a block diagram showing a hardware configuration according to the present invention.

FIG. 11 shows a hardware configuration of a disk array system according to the present invention. A disk array control unit 10 includes a microprocessor unit (hereinafter, MPU) 12 serving as a control means. Connected over an internal bus of the MPU 12 are a host interface 16 for receiving an input or output request from a host computer 18 serving as an upper-level system, a ROM 20 that stores control programs and so on on a permanent basis, a RAM 22 used as a control memory to store data temporarily, a cache memory 26 connected via a cache controller 24, and a data transfer buffer 28. A disk array 46 is connected to the disk array control unit 10. The disk array 46 comprises, in this embodiment, twelve disk units 32-1 to 32-12. Five of the twelve disk units, 32-1 to 32-5, constitute a rank 48-1. Five disk units 32-7 to 32-11 constitute a rank 48-2. Two disk units 32-6 and 32-12 are provided as auxiliary disk units. The disks in the ranks 48-1 and 48-2 are grouped by locations in the direction in which the disk units are arranged and accessed in common by the disk array control unit 10. The disk array control unit 10 includes device adapters 30-1 to 30-6. The device adapter 30-1 is, for example, connected to each of the first disk unit 32-1 in the rank 48-1 and the first disk unit 32-7 in the rank 48-2.

Figure 12:
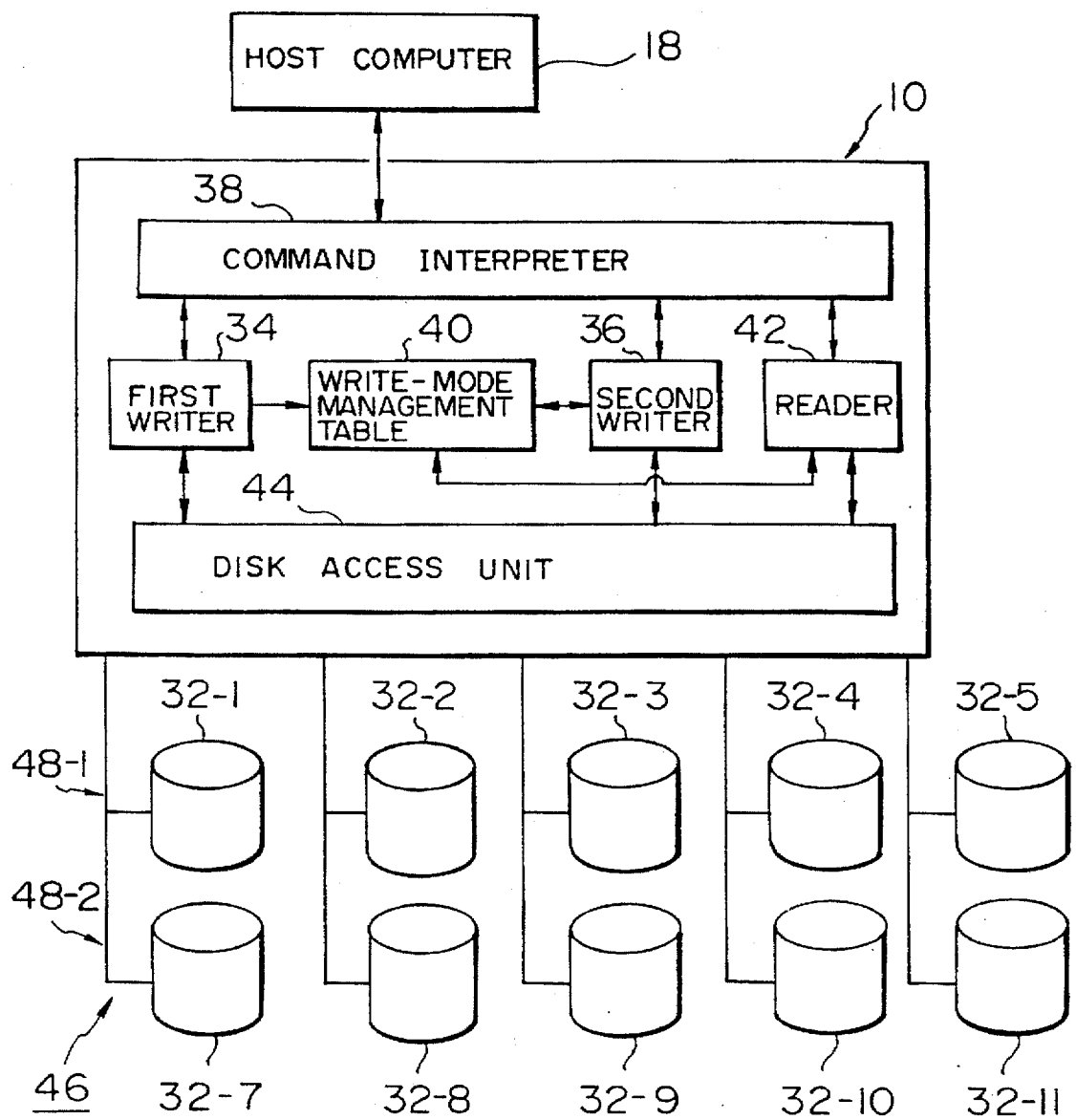
FIG. 12 is a block diagram showing an access facility according to the present invention.

FIG. 12 shows an access facility for the hardware configuration in FIG. 11 according to the present invention. The disk array control unit 10 includes a command interpreter, a first writer 34, a second writer 36, a write-mode management table 40, a reader 42, and disk accessor 44. The capabilities of the command interpreter 38, first writer 34, second writer 36, reader 42, and disk accessor 44 are implemented in programs that run under the control of the MPU 12 in FIG. 11. The write-mode management table 40 is developed in the RAM 22 serving as a control memory. The command interpreter 38 interprets a command accompanying an input or output request sent from the host computer 18. If the command is a write command, the command interpreter 38 selects either the first writer 34 or second writer 36 according to an amount of write data, and executes write for the disk array 46 using the disk accessor 40.

The first writer 34 is activated to handle a small amount of write data, and executes write in the individual access mode. For example, the disk units 32-1 to 32-5 in the rank 48-1 are accessed individually, and data split in sectors is written therein. The individual write mode corresponds to the fifth level RAID operation mode shown in FIG. 6.

Figure 1:
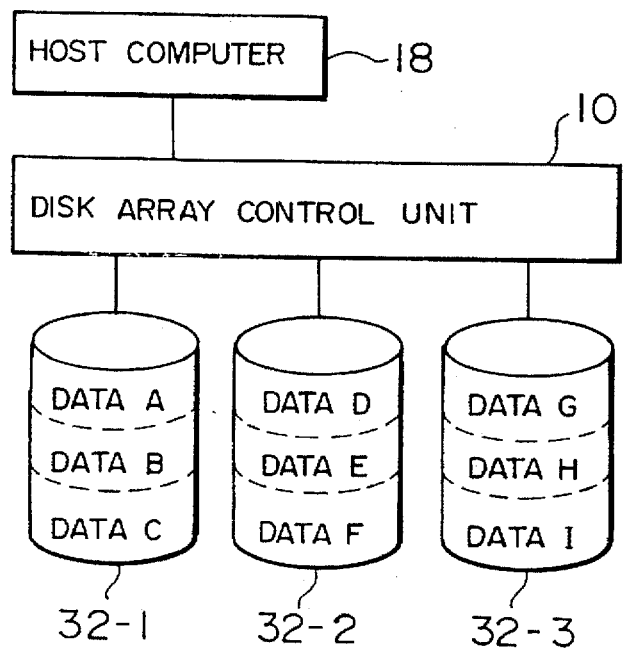
FIG. 1 is an explanatory diagram showing a disk array system of the RAID level 0.
Figure 2:
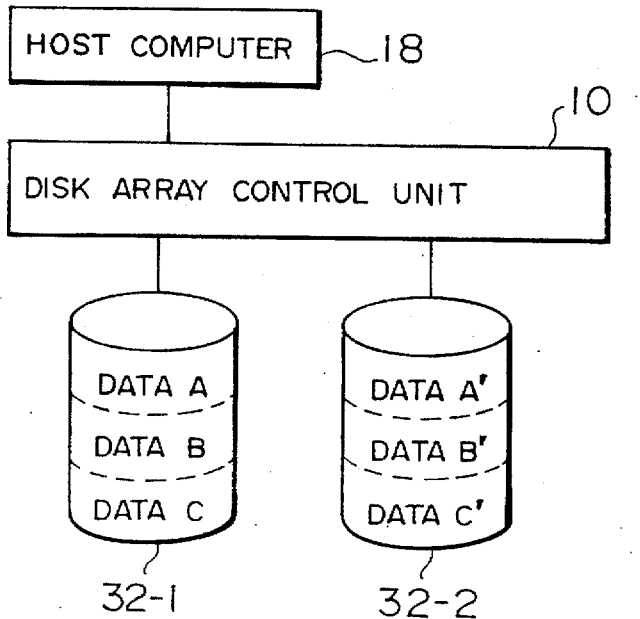
FIG. 2 is an explanatory diagram showing a disk array system of the RAID level 1.
Figure 3:
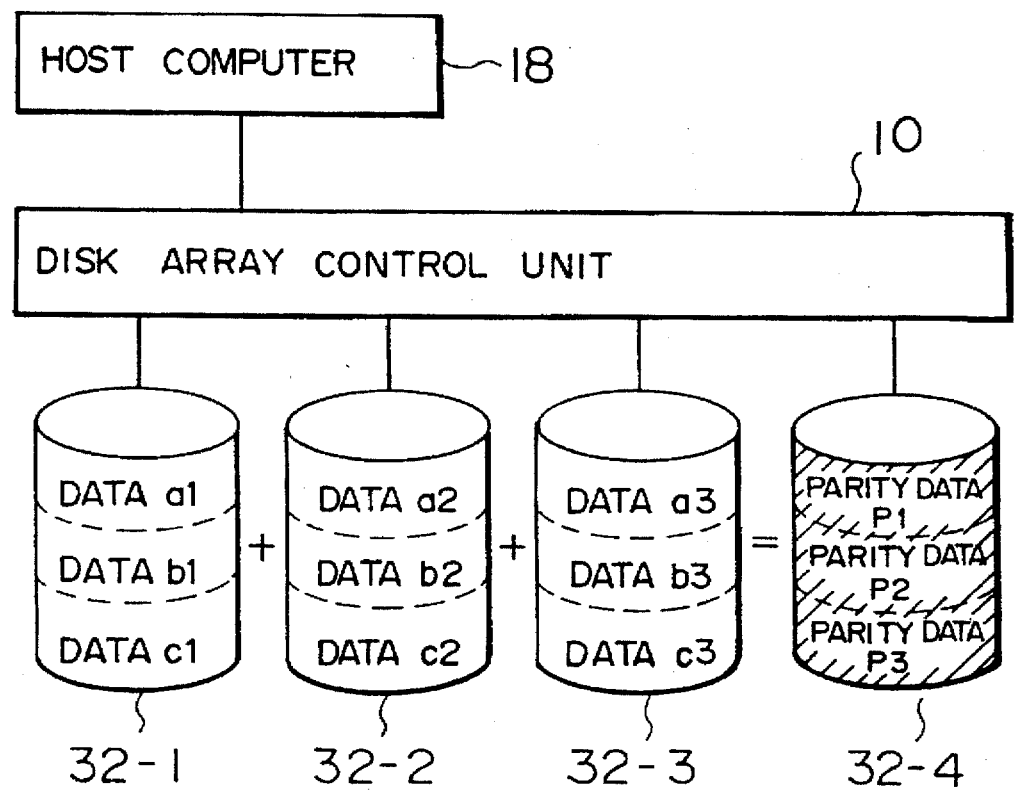
FIG. 3 is an explanatory diagram showing a disk array system of the RAID level 3.
Figure 4:
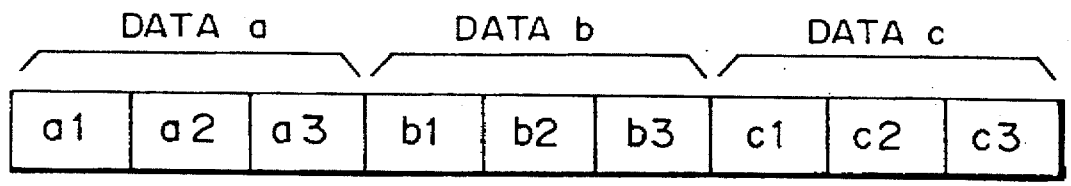
FIG. 4 is an explanatory diagram showing data split in Level 3 RAID.
Figure 5:
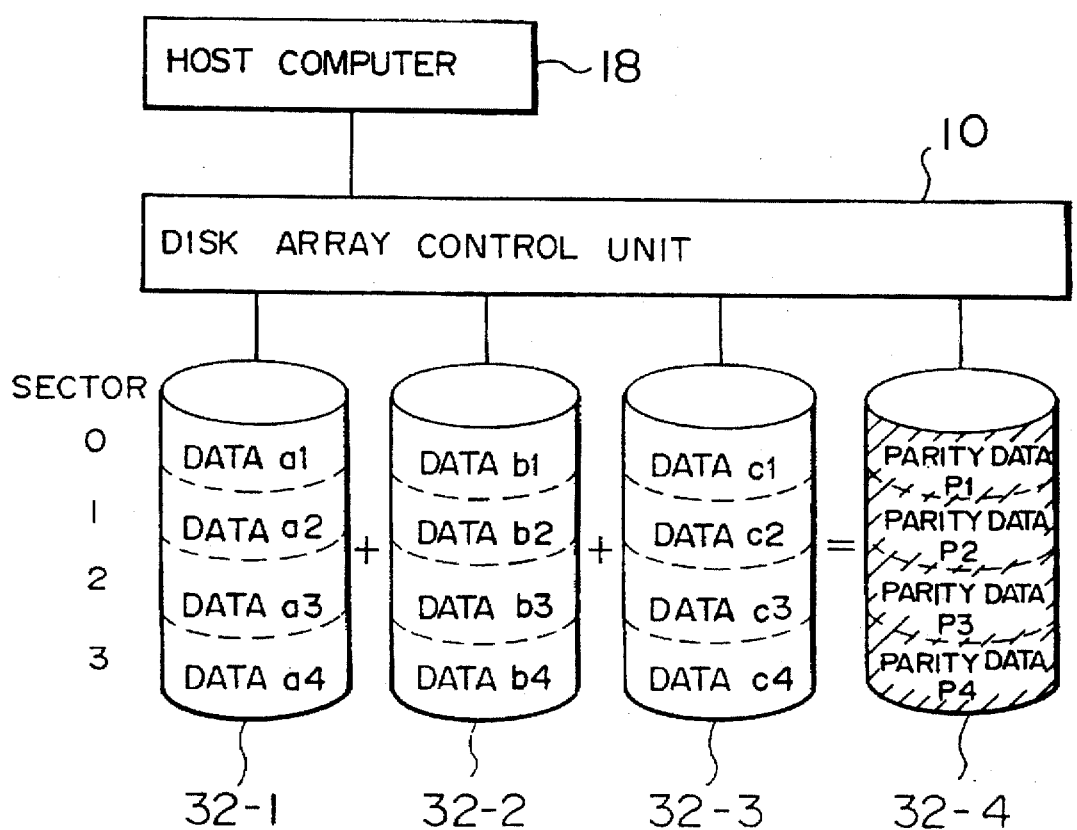
FIG. 5 is an explanatory diagram showing a disk array system of the RAID level 4.

The second writer 36 is activated to handle a large amount of write data, and executes write in the parallel access mode. For example, the disk units 32-1 to 32-4 in the rank 48-1 are accessed in parallel, and data split in sectors is written therein. Write in the parallel access mode executed by the second writer 36 corresponds to the third level RAID operation shown in FIG. 3. Even when an amount of data is large, the second writer 36 does not execute write in the parallel access mode immediately. Prior to writing, the second writer 36 checks if all the disk units 32-1 to 32-5 in the rank 48-1 are accessible, if they are all accessible, the second writer 36 executes data write in the parallel access mode. When all the disk units 32-1 to 32-5 are inaccessible, the second writer 36 performs writing according to the data storage form for the individual access mode inherent to the first writer 34. However, the second writer 36 can produce a parity data serving as redundant information in the parallel access mode inherent to the second writer 36 without reading a parity data and data from disk units.

In the write-mode management table 40, information concerning the write modes inherent to the first writer 34 and second writer 36 are registered in sectors. The reader 42 is activated when the command interpreter 38 interprets a read command. Based on a sector address for which reading is instructed, the reader 42 references the write-mode management table 40, and executes read in the individual write mode or parallel write mode using the disk accessor 44. In either of the write modes, multiple disk units can be read in parallel.

FIG. 13 shows write data split in sectors according to the present invention. Assuming that the host computer 18 transfers data a, b, c, and d used for writing, each of the data a, b, c, and d is split in sectors so as to be written in the disk array 46 by the first writer 34 or second writer 36. For example, the data a is split into four sector data a1 to a4. The same applies to the other data b to d.

Figures 14A, 14B:
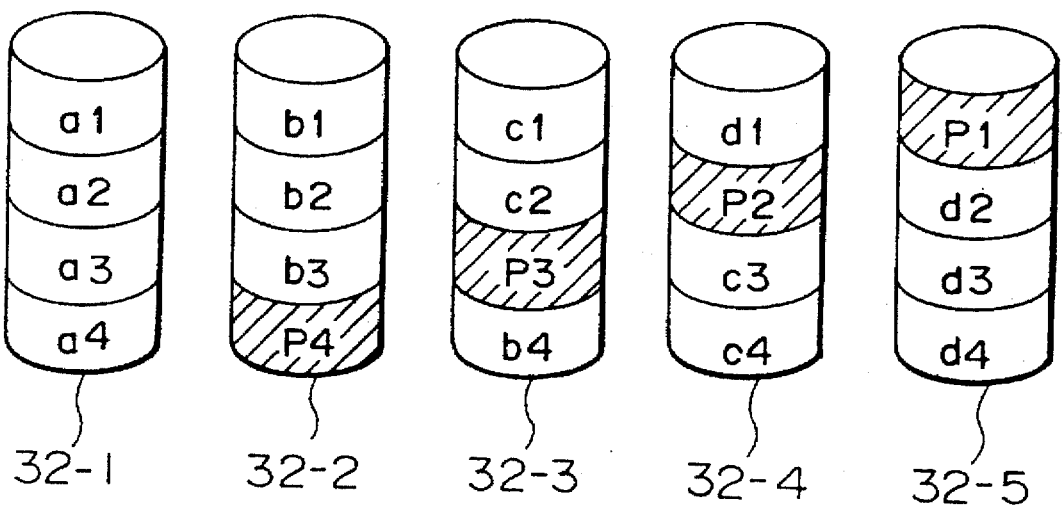
FIGS. 14A and 14B are explanatory diagrams showing an individual access mode according to the present invention.

FIGS. 14A and 14B are explanatory diagrams showing the individual access mode specific to the first writer 34 in FIG. 12. The individual access mode corresponds to the fifth level RAID operation mode,. According to the parity data production form in the individual access mode, as shown in FIG. 14A, old data is read from a write object sector in a disk unit, and an old parity data is read from a location in a parity data storage disk unit corresponding to the location of the old data. The old data and old parity data read from the disk units, and sector data to be written newly or a new parity data is exclusive-ORed to produce a new parity data.

According to the data storage form in the individual access mode, as shown in FIG. 14B, disk units are fundamentally allocated to individual data by the data unit that is not split. For example, the first sector data a1, b1, c1, and d1 of the data a to d shown in FIG. 13, and a parity data P1 are stored in the first sectors of the disk units 32-1 to 32-5. For writing, the disk units 32-1 to 32-5 are accessed individually.

Figure 15A:
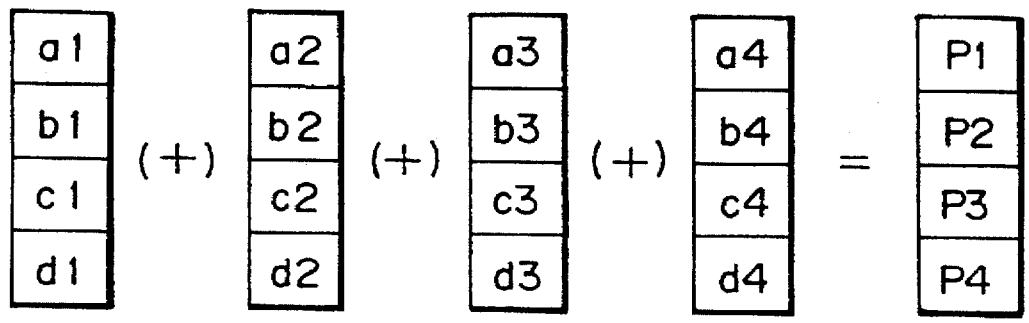
FIGS. 15A and 15B are explanatory diagrams showing a parallel access mode according to the present invention.
Figure 15B:
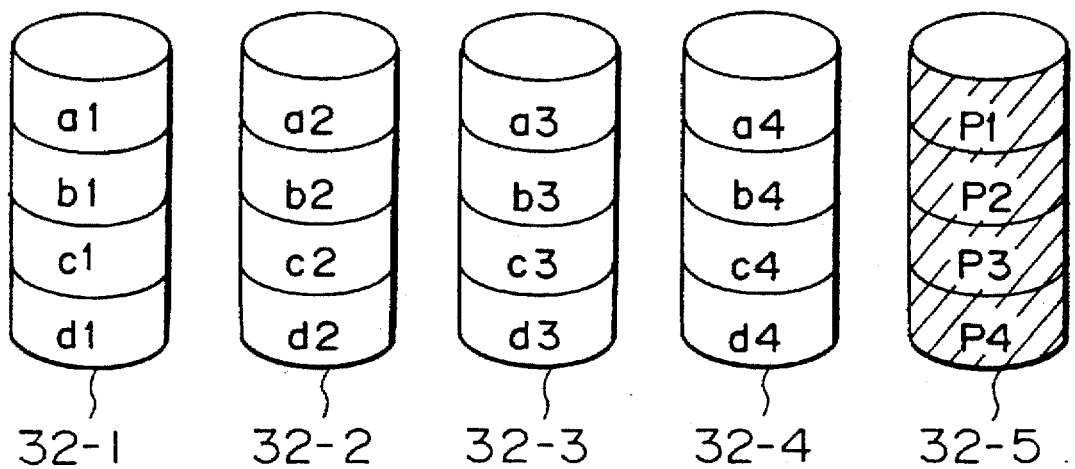

FIGS. 15A and 15B are explanatory diagrams showing the parallel access mode specific to the second writer 36 in FIG. 12. The parallel access mode corresponds to the third level RAID operation mode. According to the parity data production form in the parallel access mode, data split in sectors as shown in FIG. 13 is stored, as shown in FIG. 15A, in the direction in which the disk units 32-1 to 32-5 are lined up (i.e. across the disk units). The sector data a1 to a4, b1 to b4, c1 to c4, or d1 to d4 of the data a, b, d, or d are exclusive-ORed to produce a parity data P1, P2, P3, or P4. Parity-data production does not make it necessary to read old data and an old parity from disk units. This results in the short processing time of data write.

Figure 16A:
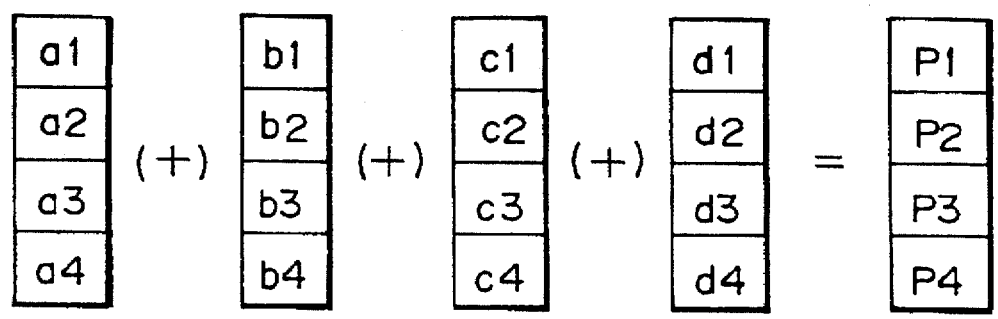
FIGS. 16A and 16B are explanatory diagrams showing a combined mode, in which the parity-data production form for the parallel access mode and the data storage form for the individual access mode are used in combination, according to the present invention.
Figure 16B:
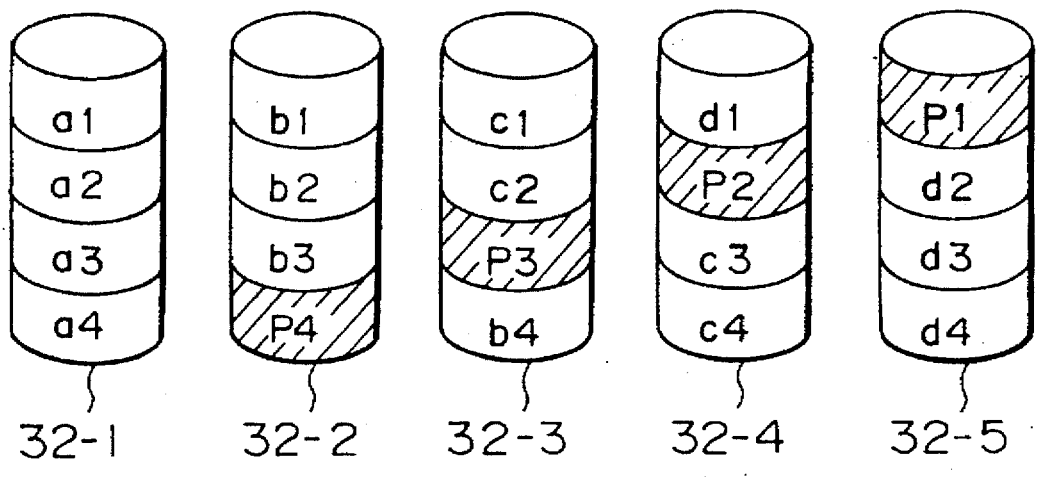

FIGS. 16A and 16B are explanatory diagrams showing a combined mode in which the second writer 36 in FIG. 12 produces a parity data in the parallel access mode, while the second writer 36 stores data in the individual access mode. Sector data resulting from the split of write data as shown in FIG. 13 are, as shown in FIG. 16B, stored in the individual access mode shown in FIG. 14B. Sector data streams are produced on the assumption of the storage form in FIG. 16B. The sector data a1, b1, c1, and d1 residing in the corresponding sector locations are exclusive-ORed to produce a parity data P1. The same applies to the remaining sector data. Although data are stored according to the data storage form for the individual access mode, parity data is produced according to the form for the parallel access mode. This obviates the necessity of reading old data and old parity data from the disk units 32-1 to 32-5. Compared with the orthodox parallel access mode shown in FIGS. 15A and 15B, this combined mode permits the shorter write time for writing a parity bit. For writing data, similarly to that in the individual access mode shown in FIGS. 14A and 14B, the disk units 32-1 to 32-5 are accessed individually and written asynchronously. Compared with parallel writing in the parallel access mode shown in FIG. 15A and 15B, the data writing in the combined mode takes much time. The combined mode shown in FIGS. 16A and 16B can be said as an intermediate write mode positioned between the individual access mode shown in FIG. 14A and 14B and the parallel access mode shown in FIGS. 15A and 15B.

Figure 17:
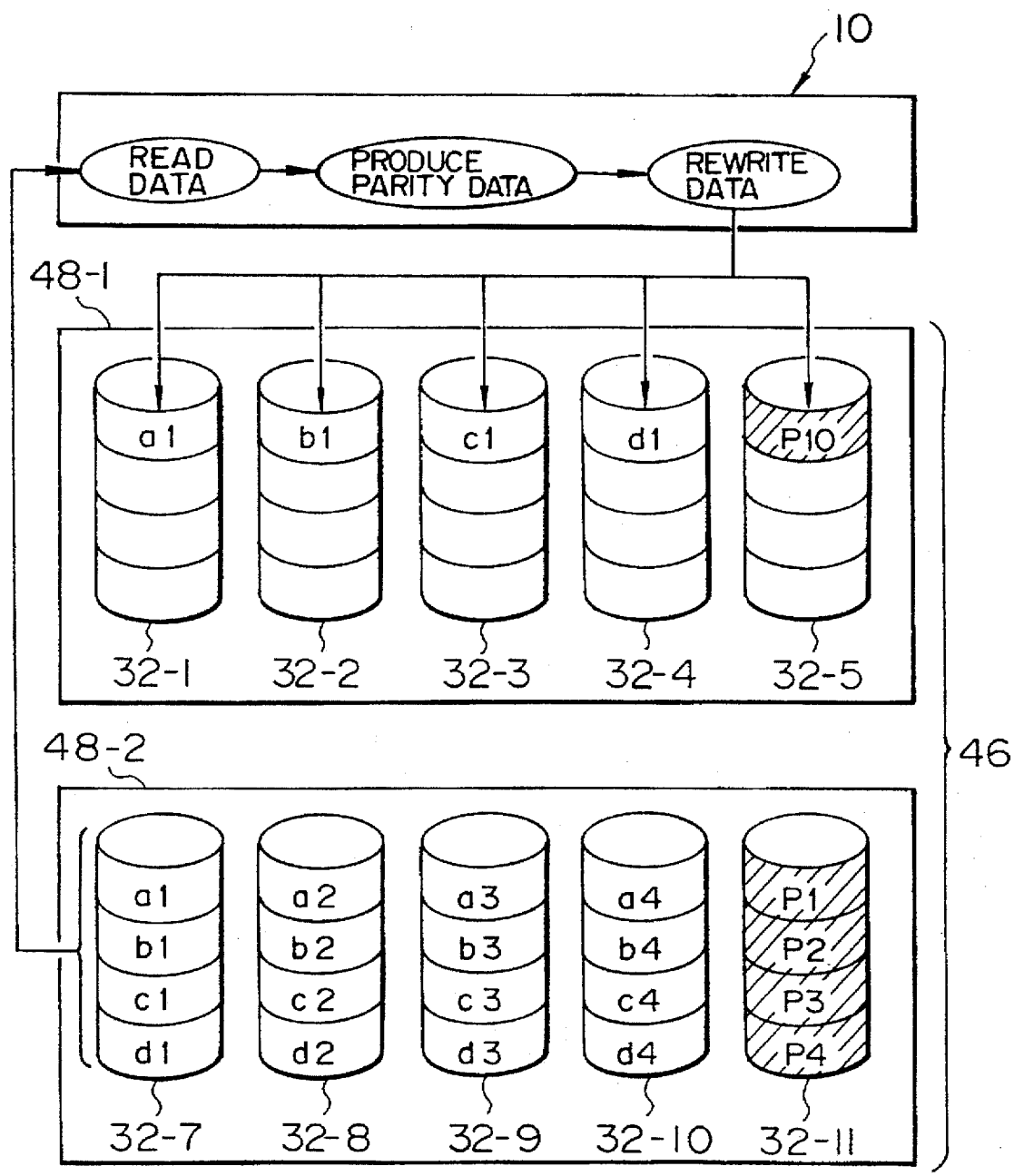
FIG. 17 is an explanatory diagram showing data rewriting in the individual access mode performed after data writing in the parallel access mode according to the present invention.

FIG. 17 shows data rewriting performed in the individual access mode after disk units are written in the parallel access mode shown in FIGS. 15A and 15B. When an amount of data is large and all disk units are accessible, data write is executed in the parallel access mode. When disk units to be written are the disk units 32-1 to 32-5 belonging to the rank 48-1, data write is executed for the disk units 32-7 to 32-11 belonging to the other rank 48-2. This enables rewriting after writing. When data writing is completed for the disk units 32-7 to 32-11 of the rank 48-2 in the parallel access mode, first, the disk array control unit 10 reads sector data and a parity data from the disks 32-7 to 32-11 in the rank 48-2. The disk array control unit 10 then produces a new parity data on the assumption of the data storage form for the parallel access mode according to which data are stored in the disk units 32-1 to 32-5 in the rank. 48-1. Assuming that the sector data a1, b1, c1, and d1 are read from the disk unit 32-7 in the rank 48-2, the sector data are exclusive-ORed to produce a new parity data P10. The sector data a1, b1, c1, and d1 and the parity data P10 are then written in the corresponding sector locations in the disk units 32-1 to 32-5 in the rank 48-1 in the direction in which the disk units are lined up (i.e across the disk units). Similarly, the data in the disk units 32-8 to 32-10 are rewritten into the data storage form for the individual access mode.

Figure 18:
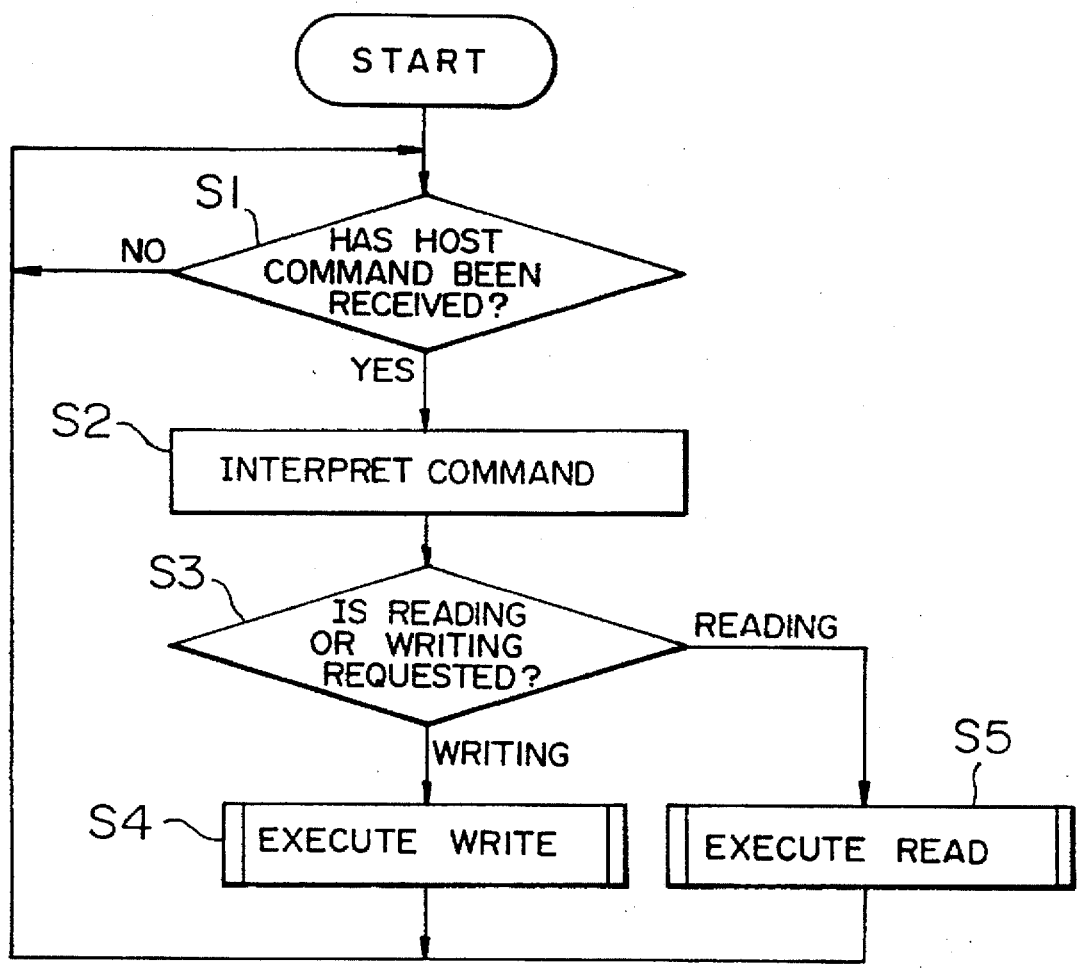
FIG. 18 is a flowchart showing the overall processing operations of the present invention.

The flowchart of FIG. 18 shows the overall processing operations according to the present invention. At a step S1, it is checked if a host command sent from the host computer 18 has been received. When a host command based on an input or output request sent from the host computer has been received, the command is interpreted at a step S2. If the result of the interpretation reveals that the command is a write request, control is passed through a step S3 to a step S4. Write is then executed. In contrast, if the command is a read request, control is passed to a step S5. Read is then executed.

Figure 19:
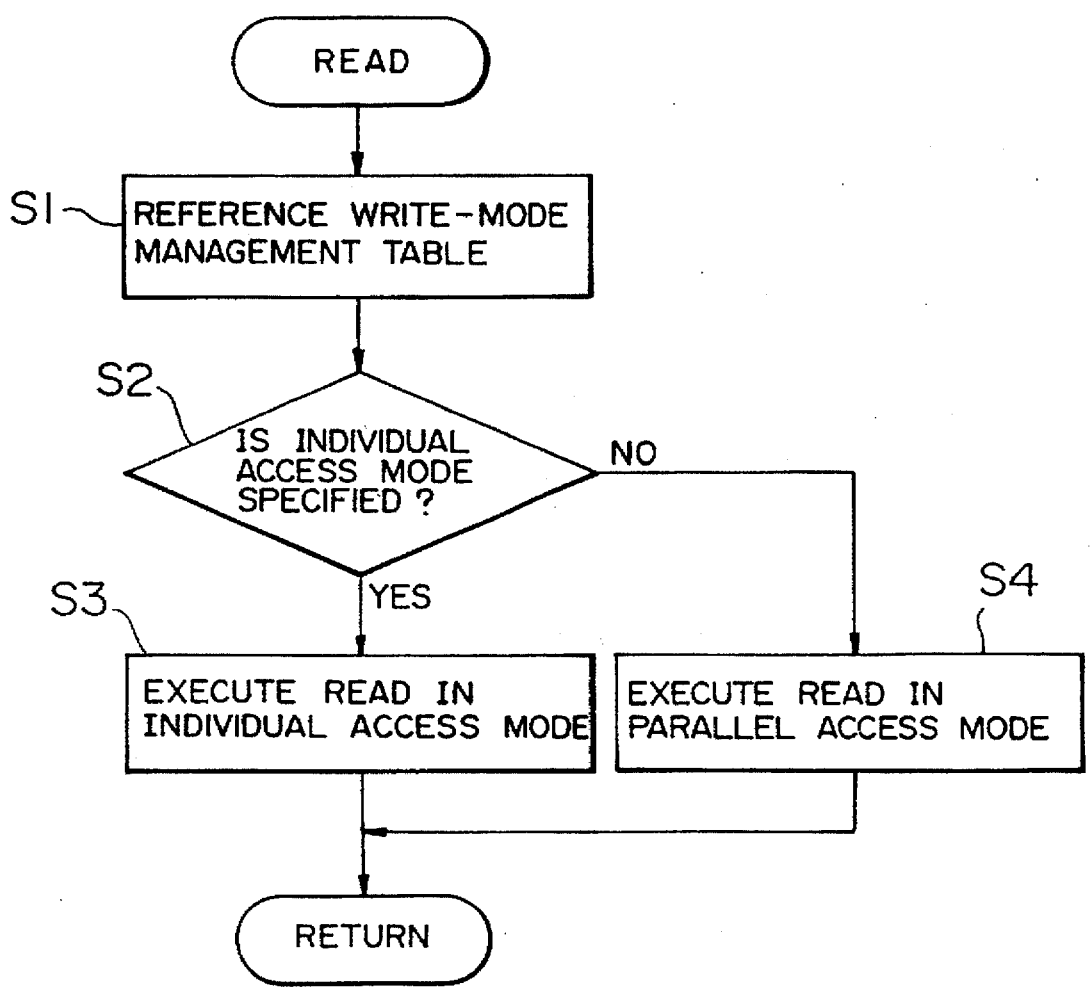
FIG. 19 is a flowchart showing the details of read in FIG. 18.

The flowchart of FIG. 19 shows read in detail. At a step S1, first, the write-mode management table 40 is referenced. At a step S2, it is checked if write in the individual access mode has been executed. According to the present invention, it is preconditioned that the data storage form for the individual access mode should be adopted to write disk units. However, rewriting may not be completed and the data storage form for individual access mode may remain intact. It is therefore checked at the step S2 if write in the individual access mode has been executed. For reading write data written in the individual access mode, read is executed at a step S3. Specifically, a disk unit designated with a disk unit ID, which is specified in a command sent from an upper-level system, and a disk unit associated with a data address are accessed individually to read sector data. The sector data are temporarily stored in the data transfer buffer 28 in the disk array control unit 10 shown in FIG. 11, and then transferred to the host computer 18 via the host interface 16. For reading write data written in the parallel access mode, a disk unit designated with a disk unit ID, which is specified in a command sent from the upper-level system, and a disk unit associated with a data address are accessed individually or in parallel to read sector data. The sector data are then stored in the data transfer buffer 28 temporarily, and then transferred to the host computer 18 via the host interface 16.

Figure 20:
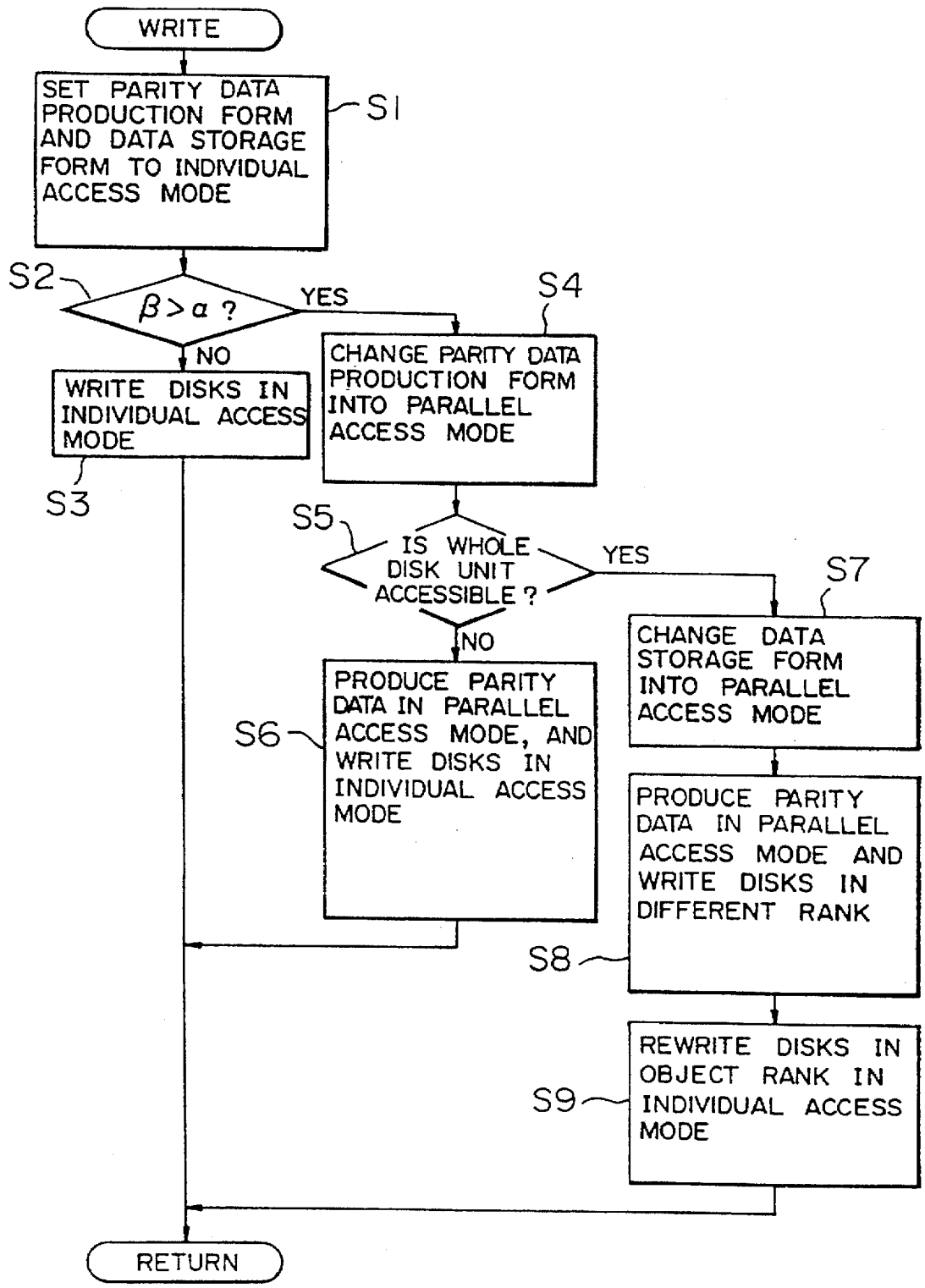
FIG. 20 is a flowchart showing the details of write in FIG. 18.

The flowchart of FIG. 20 shows write at the step S4 in FIG. 18 in detail. The processing following this flowchart is implemented by the facility, which is shown in FIG. 12, consisting of the command interpreter 38, first writer 34, second writer 36, and disk accessor 40. At a step S1, the parity-data production form and data storage form are set to the individual access mode. At a step S2, it is checked whether or not an amount of write data β sent from the host computer is larger than a specified amount of data α. If the amount of write data β is smaller than the specified amount of data α, control is passed to a step S3. A parity data is produced in the individual access mode set at the step S1, and then written in a disk. Since writing a parity data into a disk unit in the individual access mode at the step S3 involves reading old data and an old parity data from disk units for producing the parity data, the processing time for writing a parity data in a disk unit becomes long. However, since the amount of data β is small, the overall access time is not so long.

If it is found at the step S2 that the amount of write data α is larger than the specified amount of data, the processing at and after a step S4 proceeds. The processing is implemented in the second writer 36 in FIG. 12. At the step S4, the parity-data production form is changed from the individual access mode set at the step S1 to the parallel access mode. As a result, the parallel access mode is set for parity-data calculation. The data storage form is set to the individual access mode. At a step S5, it is checked if all disk units belonging to a write object rank are accessible. If any of the disk units in the write object rank is busy, control is passed to a step S6. Based on the result of the setting at the step S4, a parity data is produced in the parallel access mode. Next, data are written in disk units in the individual access mode. The combined mode in which a parity data is produced in the parallel access mode, and data and parity data is stored in the individual access mode is shown in FIGS. 16A and 16B.

If it is found at the step S5 that all disk units in an access object rank are accessible, control is passed to a step S7. The data storage form is changed to the parallel access mode. Thus, both the parity-data production form and data storage form are set to the parallel access mode. Next, at a step S8, the disk array control unit 10 produces a parity data according to the production form for the parallel access mode, and executes write for the disk units in the other rank, which is different from the write object rank, in the parallel access mode. Write in the parallel access mode does not involve reading disk units for parity-data production. Furthermore, all disk units can be accessed in parallel and written asynchronously. Even if an amount of data is large, data writing can be done at a high speed.

At a step S9, as shown in FIG. 17, data and parity data written in the disk units in a different rank in the parallel access mode are read disk unit by disk, and rewritten into the disk units in an object rank in the individual access mode. Thus, the data and parity data is rewritten according to the data storage form for the individual access mode. The rewrite into the data storage form for the individual access mode of the step S9 does not interfere with an input or output request sent/from the host computer. If an input or output request is issued, it is preferred that rewriting is suspended and restarted after the input or output request has been handled.

Figures 21A, 21B:
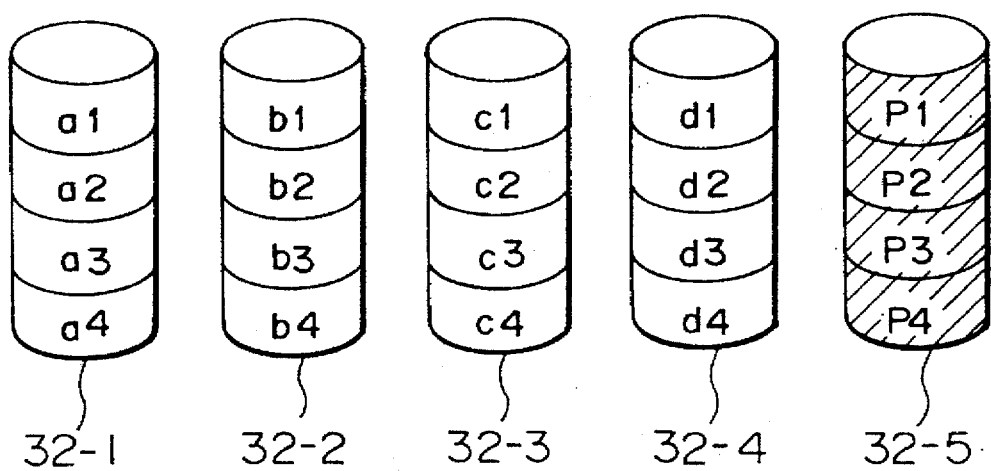
FIGS. 21A and 21B are explanatory diagrams showing another individual access mode according to the present invention.

FIGS. 21A and 21B show another embodiment of an individual access mode according to the present invention. In the individual access mode shown in FIGS. 14A and 14B, a parity-data storage location differs with a disk unit. In the individual access mode of this embodiment, a parity-data storage disk unit is fixed to, for example, the disk unit 32-5 shown in FIG. 21B. This individual access mode corresponds to the fourth level RAID organization. The parity-data production form in FIG. 21A is identical to that in FIG. 14A.

Figure 22:
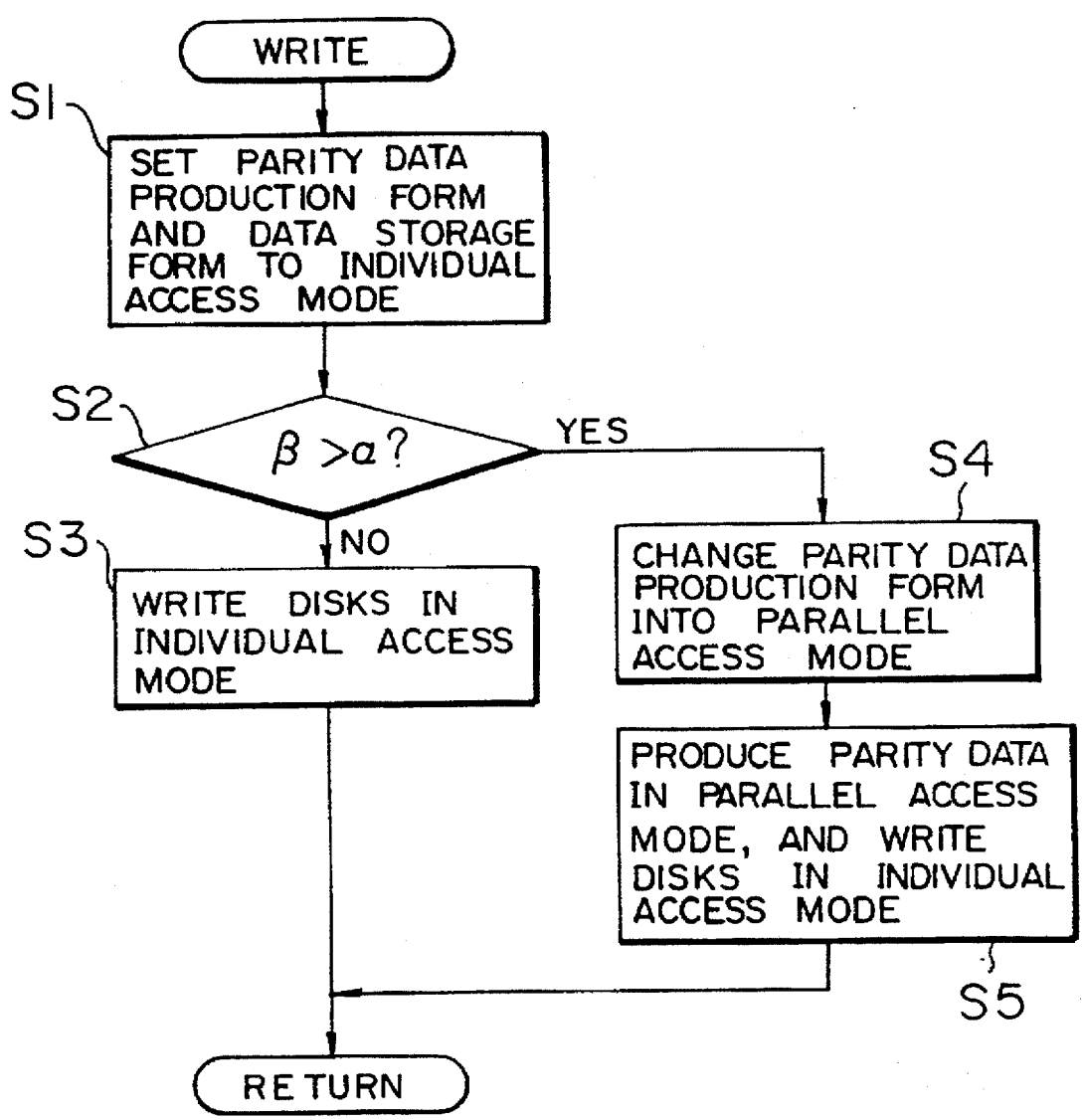
FIG. 22 is a flowchart showing another embodiment of write in FIG. 18.

The flowchart in FIG. 22 shows another embodiment of write at the step S4 in FIG. 18. In write in FIG. 20, an access mode varies depending on whether or not all disk units are accessible, when the amount of write data is larger than the specified amount of data. In contrast, an embodiment in FIG. 22 changes the parity-data production form into the parallel access mode at a step S4, produces a parity data in the parallel access mode at a step S5, and then writes disk units in the individual access mode. Irrelevant of whether or not all disk units are accessible, a combined operation mode is set up: parity-data production is executed in the parallel access mode shown in FIGS. 16A and 16B and data storage is executed in the individual access mode.

In the embodiment in FIG. 22, writing data in the parallel access mode alone is not carried out. Rewriting into the data storage form for the individual access mode shown in FIG. 17 is therefore unnecessary.

As mentioned above, according to the present invention, the parallel access mode and individual access mode can be used selectively depending on an amount of write data specified in an input or output request sent from an upper-level system. Data writing can be performed by exerting the effects of the respective operation modes. This results in the improved accessibility of a disk array system.

As shown in the hardware configuration in FIG. 11, in the aforesaid embodiments, one rank consists of five data storage disk units and one parity-data storage disk. The numbers of data storage and parity-data storage disk units can be set arbitrarily according to the purpose of use. The same applies to the number of ranks.

Fault Recovery in a Disk Array

Figure 23:
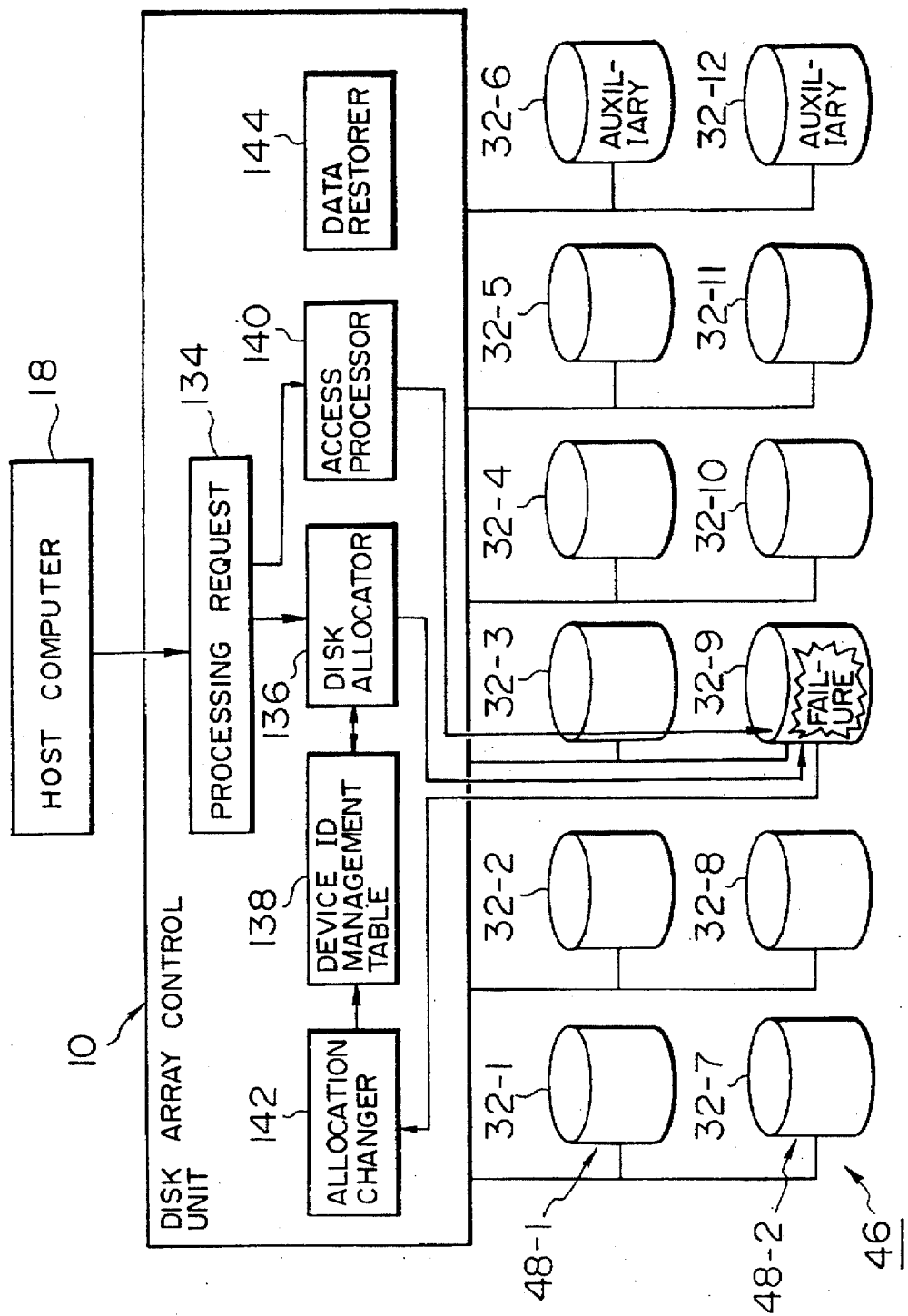
FIG. 23 is a functional block diagram showing the contents of processing performed in case of a failure according to the present invention.

FIG. 23 shows the facility for handling a fault according to the present invention. The hardware configuration of a disk array control unit 10 is, as shown in FIG. 11, composed of an MPU 12, a ROM 29, a RAM 22, a cache controller 24, a cache memory 26, a data transfer buffer 28, and a host interface 16.

A disk array 46 connected to the unit array control unit 10 consists of two ranks 48-1 and 48-2 in this embodiment. The rank 48-1 is made up of six disk units 32-1 to 32-6. At the time of system startup, four disk units 32-1 to 32-4 are allocated to data and the disk unit 32-5 is allocated to parity data. The disk unit 32-6 is assigned to an auxiliary disk unit. For the rank 48-2, the four disk units 32-7 to 32-10 are allocated to data, the disk unit 32-11 is allocated to parity data, and the disk unit unit 32-12 is assigned to an auxiliary disk unit. The configuration of the disk array 46 in this embodiment corresponds to the RAID organization of Level 3, 4, or 5.

The disk array control unit 10 has the capabilities of a disk allocator 136, a device ID management table 138, an access processor 140, an allocation changer 142, and a data restorer 144. The disk allocator 136, access processor 140, allocation changer 142, and data restorer 144 are implemented in programs that run under the control of the MPU 12 in FIG. 11. The device ID table 138 is developed in the RAM 22 serving as a control memory. The device ID management table 38 stores table data for use in relating a logical ID of a disk unit to be accessed, which is specified in a processing request 134 or a host command sent from the host computer 18, with a physical ID each disk unit bears.

FIG. 24 shows the contents of the device ID management table 138 before modification or in an initial state at the time of system startup. Device numbers 01 to 12 are assigned to the disk units 32-1 to 32-12 in that order. Logical IDs handled in the host computer 18 and physical IDs handled by the disk array control unit 10 are listed in one-to-one correspondence with device numbers. For example, the disk units 32-1 and 32-7 at the corresponding locations in the ranks 48-1 and 48-2 have device numbers 01 and 07 and logical IDs 0101 and 0107 respectively. For better understanding, the physical IDs in the initial state are the same as the logical IDs; that is, 0101 and 0107. The disk units 32-6 and 32-12 assigned to auxiliary disk units in the rank 48-1 and 48-2 have logical IDs 0606 and 0612. The physical IDs are the same as the logical IDs 0606 and 0612 for better understanding.

Back to FIG. 23, in response to the processing request 134 sent from the host computer 18, the disk allocator 136 references the device ID management table 138 using the logical ID specified in the processing request 134, reads a corresponding physical ID, and then issues a setup control instruction as a setup request to the disk unit designated with the physical ID. In response to the setup instruction, the disk unit designated with the physical ID sent from the disk allocator 136 returns a Completed notice at the completion of setup. With the setup Completed notice, the access processor 140 is activated to check the contents of the processing request sent from the host computer 18; that is, to determine whether the processing request specifies read or write. The access processor 140 then executes read or write for the disk unit that has been designated with the physical ID and has set up.

Next is the processing to be performed when a disk, which has been designated with a physical ID and received a setup instruction from the disk allocator 36, has failed. The disk allocator 136 issues a setup instruction to, for example, the disk unit 32-9 in the rank 48-2. Assuming that the disk unit 32-9 has failed, the disk unit 32-9 cannot return a Completed reply for the setup instruction sent from the disk allocator 36 because it has failed to set up. If the disk unit 32-9 is the failure, the disk unit 32-9 returns a reply for requesting the check of itself to the disk array control unit 10. The disk array control unit 10 checks the reply of the disk unit 32-9 and becomes aware of the failure. In practice, as shown in FIG. 11, the disk allocator 36 interfaces with the disk unit 32-9 via the device adapter 30-3 in FIG. 11.

When it is detected that the disk unit 32-9 requested to set up has failed, the allocation changer 142 is activated. The allocation changer 142 then modifies the contents of the device ID management table 138. Specifically, the physical ID of the failing disk unit 32-9 is exchanged for the physical ID of the auxiliary disk unit 32-12. As shown in the device ID management table in FIG. 25, the physical ID 0309 of the failing device number 09 is exchanged for the physical ID of the auxiliary device number 12. At the same time, the physical ID 0612 of the auxiliary device number 12 is exchanged for the physical ID of the failing device number 09.

Owing to the foregoing allocation change involving the modification of the device ID management table, the disk allocator 136 references the modified device ID management table, and relates the logical ID 0309 designating the failing disk unit 32-9, which is sent from the host computer 18, with the physical ID 0612. The disk allocator 136 then accesses the disk unit 32-12 that has been on standby as an auxiliary disk unit.

The auxiliary disk unit 32-12, which has been allocated instead of the failing disk unit 32-9 due to the modification of the device ID management table 32-9, is subjected to data restoration by the data restorer 144. The data restorer 144 reads data and parity data in, for example, cylinders from the data storage disk units 32-7, 32-8, and 32-10, and the parity-data storage disk unit 32-11 except the failing disk unit 32-9, which belong to the rank 48-2. The data and parity data are then exclusive-ORed by the same bit position in a bit string, whereby the data stored in the failing disk unit 32-9 can be restored. The data restorer 44 manages address pointers, each of which points to a restoration-completed area, while restoring data to the disk unit 32-12. When the processing request 34 is sent from the host computer 18 during data restoration, if the access object area specified in the processing request is with the data-restored area, the data restorer 44 suspends data restoration and enables the access processor 140 to execute read or write. When the data restorer 44 completes restoring data to the disk unit 32-12, the rank 48-2 that now has an array configuration consisting of data storage disk units 32-7, 32-8, 32-12, and 32-10, and a parity-data storage disk unit 32-11 is accessed normally.

The failing disk unit 32-9 is replaced with a new one by a maintenance engineer. After the disk unit 32-9 is renewed, the renewed disk unit 32-9 is placed as an auxiliary disk unit in the standby state so that it can be utilized in case of another disk unit failure.

Figure 26:
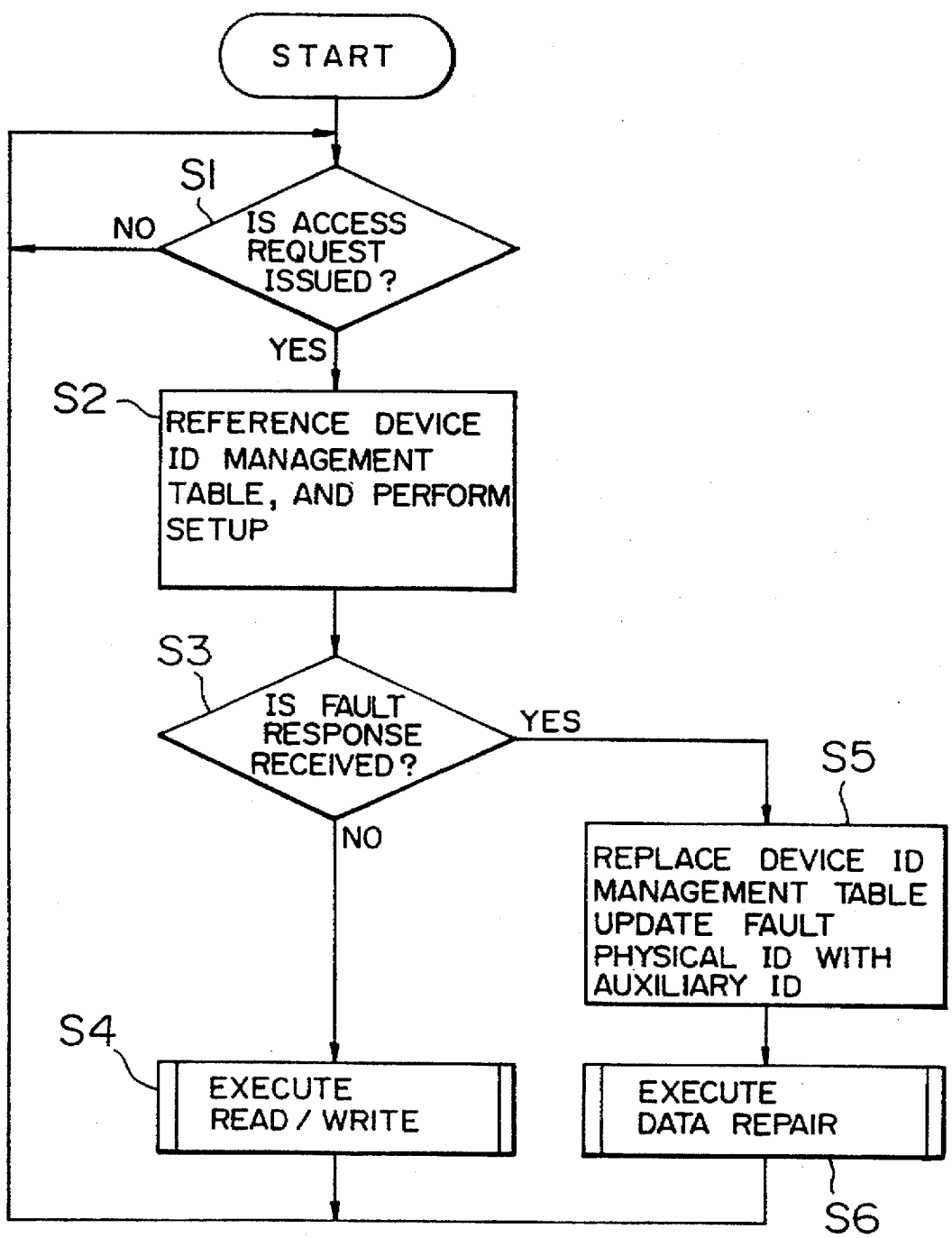
FIG. 26 is a flowchart showing the processing against a fault according to the present invention.

The flowchart of FIG. 26 shows the processing operations done by the disk array control unit 10 in FIG. 23 according to the present invention. At a step S1, the presence of an access request (processing request) issued by the host computer 18 is checked. In response to the processing request or host command sent from the host computer 18, the disk array control unit 10 passes control to a step S2. The array control unit 10 then references the device ID management table using the logical ID specified in the host command, and reads a physical ID from the device ID management table. The array control unit 10 then issues a setup instruction to the disk designated with the physical ID. When the setup instruction is issued, it is checked at a step S3 whether the disk unit has returned a fault reply. If a fault reply is not returned, control is passed to a step S4. Read or write is then executed according to the access request.

If a fault reply is returned for the setup instruction at the step S3, control is passed to the failure recovery starting at a step S5. At the step S5, the physical ID of a faulty disk unit is exchanged for the physical ID of an auxiliary disk unit in the device ID management table 138. At a step S6, data restoration is executed.

Figure 27:
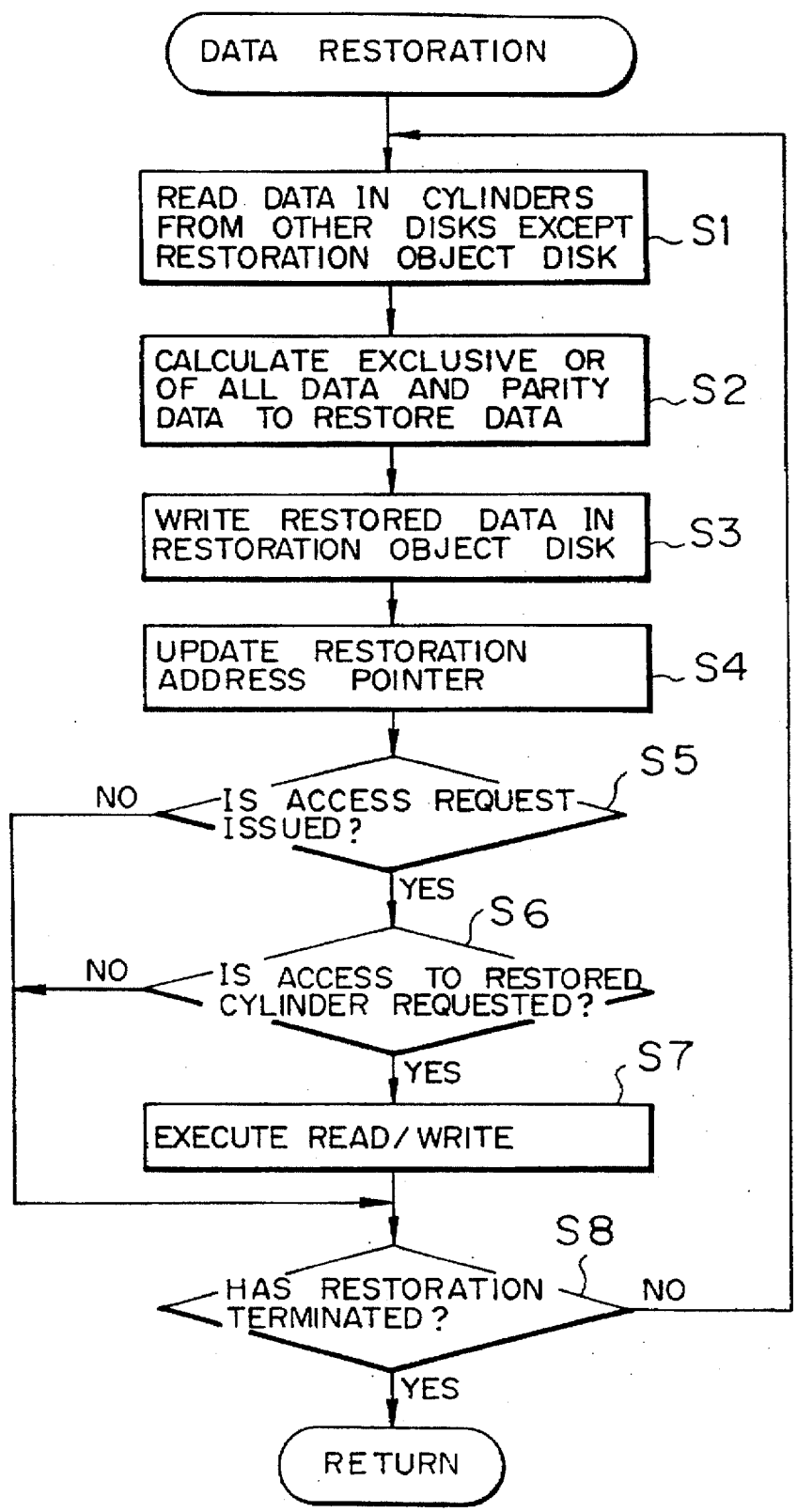
FIG. 27 is a flowchart showing the details of data restoration in FIG. 26.

The flowchart of FIG. 27 shows the details of data restoration at the step S6 in FIG. 26. First, data and parity data are read in, for example, cylinders from all data storage and parity data storage disk units except a restoration object disk unit. At a step S2, all the data and parity data read out are exclusive-ORed to restore data. At a step S3, the restored data is written in the restoration object disk unit. The address pointer pointing to a data-restored area is updated at a step S4. The presence of an access request is checked at a step S5. If an access request is present, the value of the address pointer pointing to an data-restored area is compared with the one of the address pointer pointing to an area specified in the processing request. It is thus determined whether the area specified in the processing request is the data-restored area or cylinder. If the specified area is the data-restored cylinder, read or write is executed according to the access request. If it is found at the step S5 that the access request is absent, needless to say, the operations of the steps S5 and S7 are not carried out. At a step S8, the presence of Restoration End is checked. That is to say, the sequence starting with the step S1 is repeated until all data are restored. As mentioned above, according to this embodiment, if a disk unit fails, the physical ID of the failing disk unit is exchanged for the one of an auxiliary disk unit in the device ID management table. As soon as data restoration has terminated; access can be obtained normally. This obviates the necessity of rewriting data, which has been restored to an auxiliary disk unit and restructured, into a new disk unit that has substituted for a failing disk unit. The improved data restoration efficiency ensues.

While data is being restored to an auxiliary disk unit allocated instead of a failing disk unit, data-restored areas are managed so that when an access request for a data-restored area is received during data restoration, access to the data-restored area can be executed normally. Thus, an access request may be executed even during data restoration, which leads to the improved processing performance.

In the embodiment in FIG. 23, the disk array 46 consists of two ranks. Needless to say, the number of ranks may be one. The number of data storage disk units may be set arbitrarily according to the purpose of use. The number of auxiliary disk units may exceed two.

In the aforesaid embodiment, the configuration of the disk unit array 46 corresponds to the RAID organization of Level 3 or 4, wherein a parity-data storage disk unit is fixed. Alternatively, the disk array 46 may have a configuration corresponding to the fifth level RAID organization, wherein a parity-data storage disk unit is changed at every data writing so that the storage of parity data will not congest a specified area.

Deadlock Suppression

Figure 28:
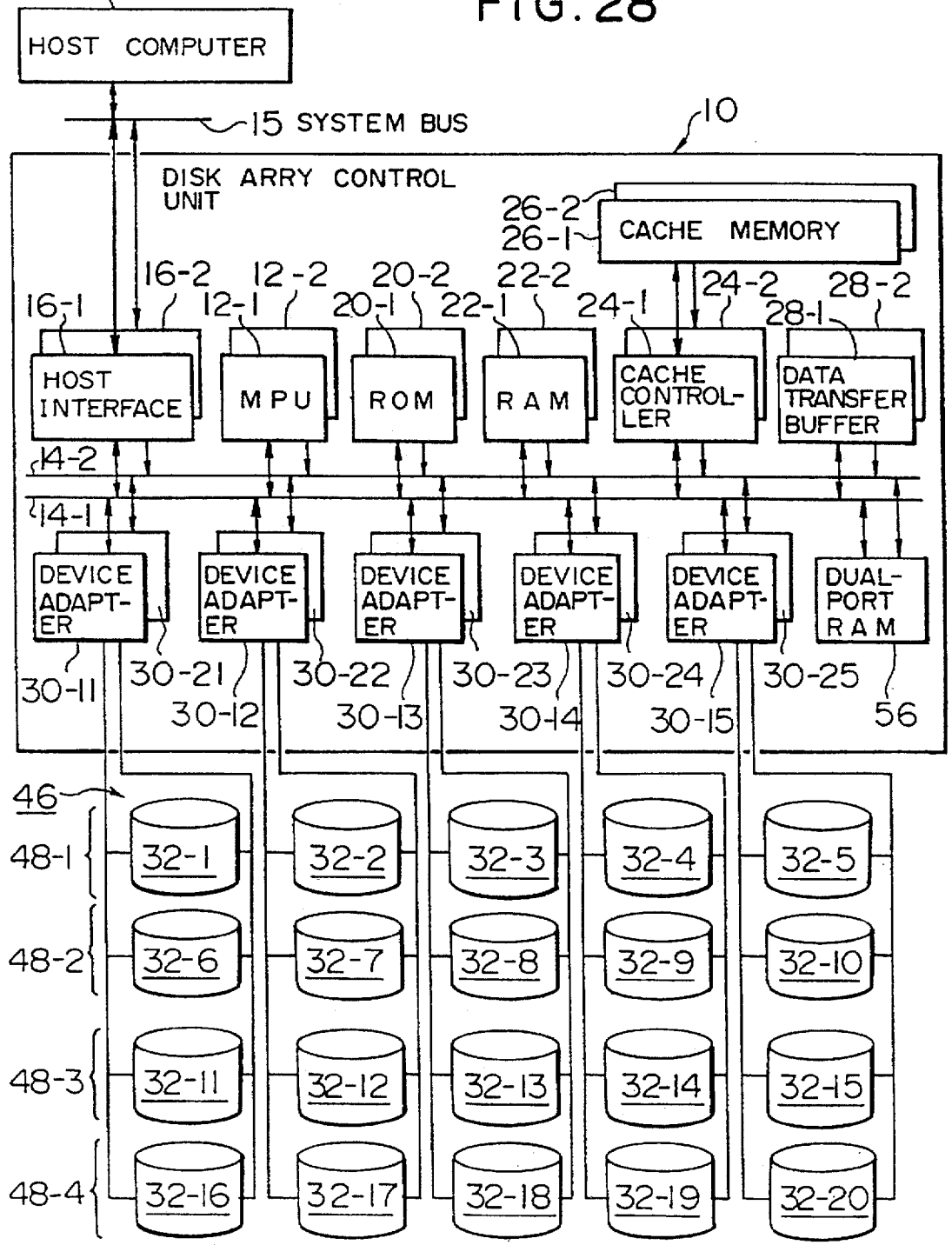
FIG. 28 is a block diagram showing a hardware configuration according to the present invention.

FIG. 28 shows a hardware configuration of a disk array system with a deadlock suppression facility according to the present invention. The disk array control unit 10 includes two-system disk unit array controllers; that is, two MPUs 12-1 and 12-2 serving as control means. Connected over the internal bus 14-1 of the MPU 12-1 are a host interface 16-1 for providing an interface with the host computer 18, a ROM 20-1 in which programs are stored on a permanent basis, a RAM 22-1 used as a control memory or a buffer, a cache memory 26-1 via a cache controller 24-1, and a data transfer buffer 28-1. Similarly, the MPU 12-2 is connected to a host interface 16-2, a ROM 20-2, a RAM 22-2, a cache memory 26-2 via a cache controller 24-2, and a data transfer buffer 28-2.

The disk array 46 in this embodiment comprises twenty disk units 32-1 to 32-20 which are grouped in fives into ranks. The disk array 46 therefore consists of four ranks of ranks 48-1 to 48-4. The disk units 32-1 to 32-20 are arranged to realize a dual-port configuration, which are therefore accessible through two different systems. The disk units 32-1 to 32-20 in the disk array 46 are connected over the internal buses 14-1 and 14-2 of the MPUs 12-1 and 12-2 via device adapters 30-11 to 30-15, and 30-21 to 30-25 that serve as interface controllers for the disk array control unit 10. Furthermore, a dual-port RAM 56 functioning as a communication control memory is connected to each of the internal buses 14-1 and 14-2.

Figure 29:
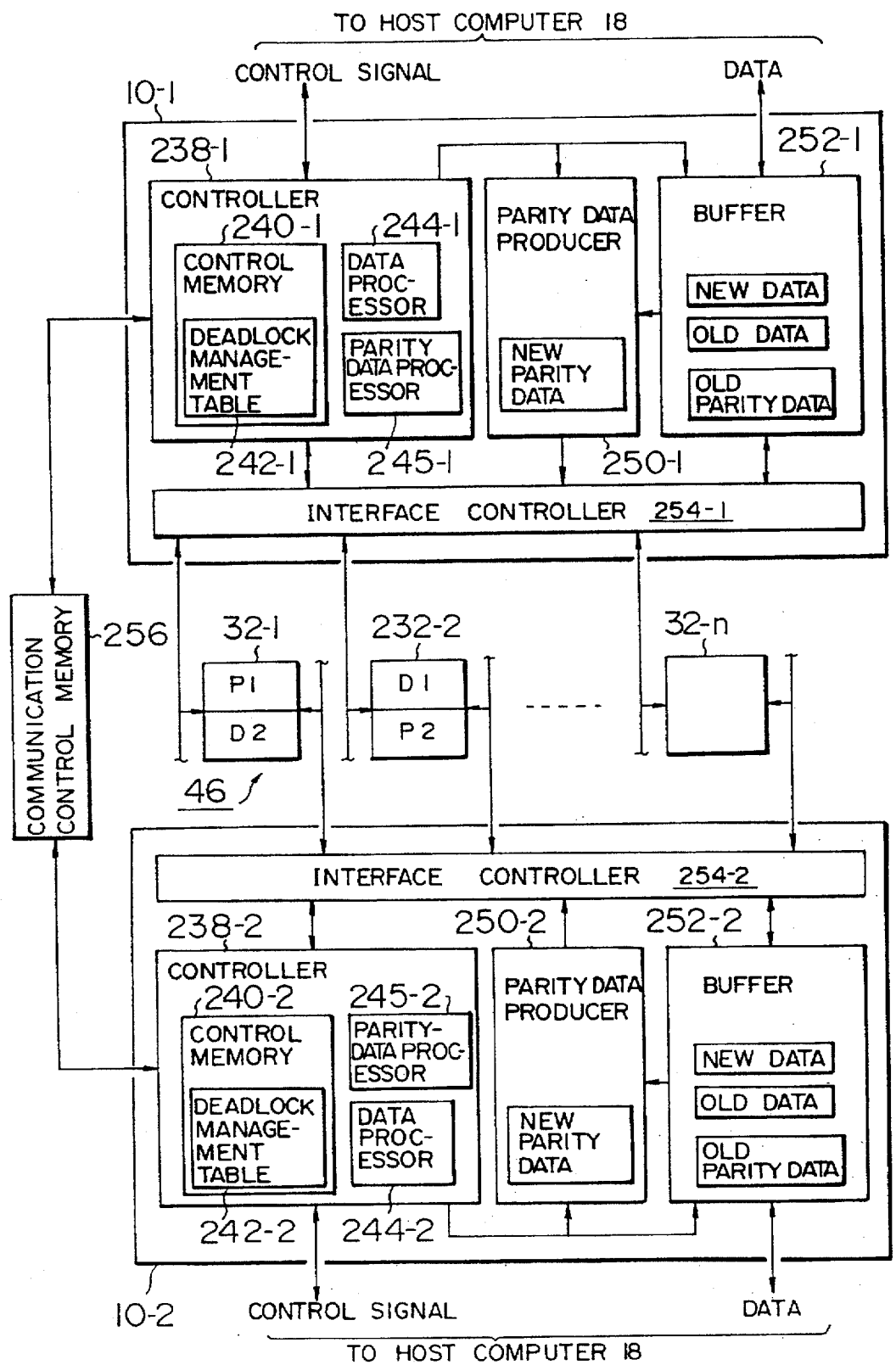
FIG. 29 is a block diagram showing the processing facilities in FIG. 28.

FIG. 29 shows the facilities in the disk array system, which includes the deadlock suppression facility, according to the present invention. Two systems of the disk array control units 10-1 and 10-2 are installed independently, which can transfer control signals and data to or from the host computer 18. The disk array control unit 10-1 includes a controller 238-1 that is implemented in programs which run under the control of the MPU. The controller 238-1 has the capabilities of a control memory 240-1, a data processor 244-1, and a parity-data processor 245-1. The data processor 244-1 rewrites the data stored in a sector, which is designated with a sector address, in a disk unit, which is designated with a logical ID, wherein the sector address and physical ID are found by the interpretation of a write command sent from the host computer 18. When the data processor 44-1 completes rewriting data, the parity-data processor 45-1 executes parity-data write.

Figure 6:
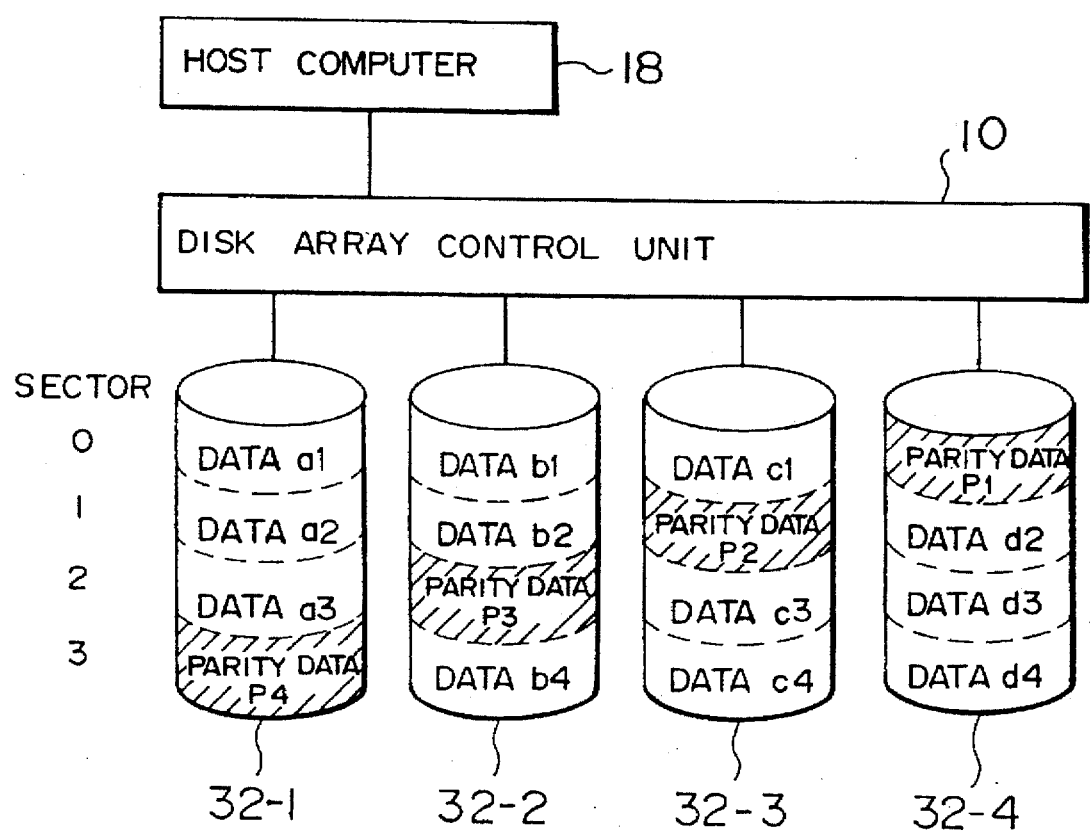
FIG. 6 is an explanatory diagram showing a disk array system of the RAID level 5.
Figure 7:
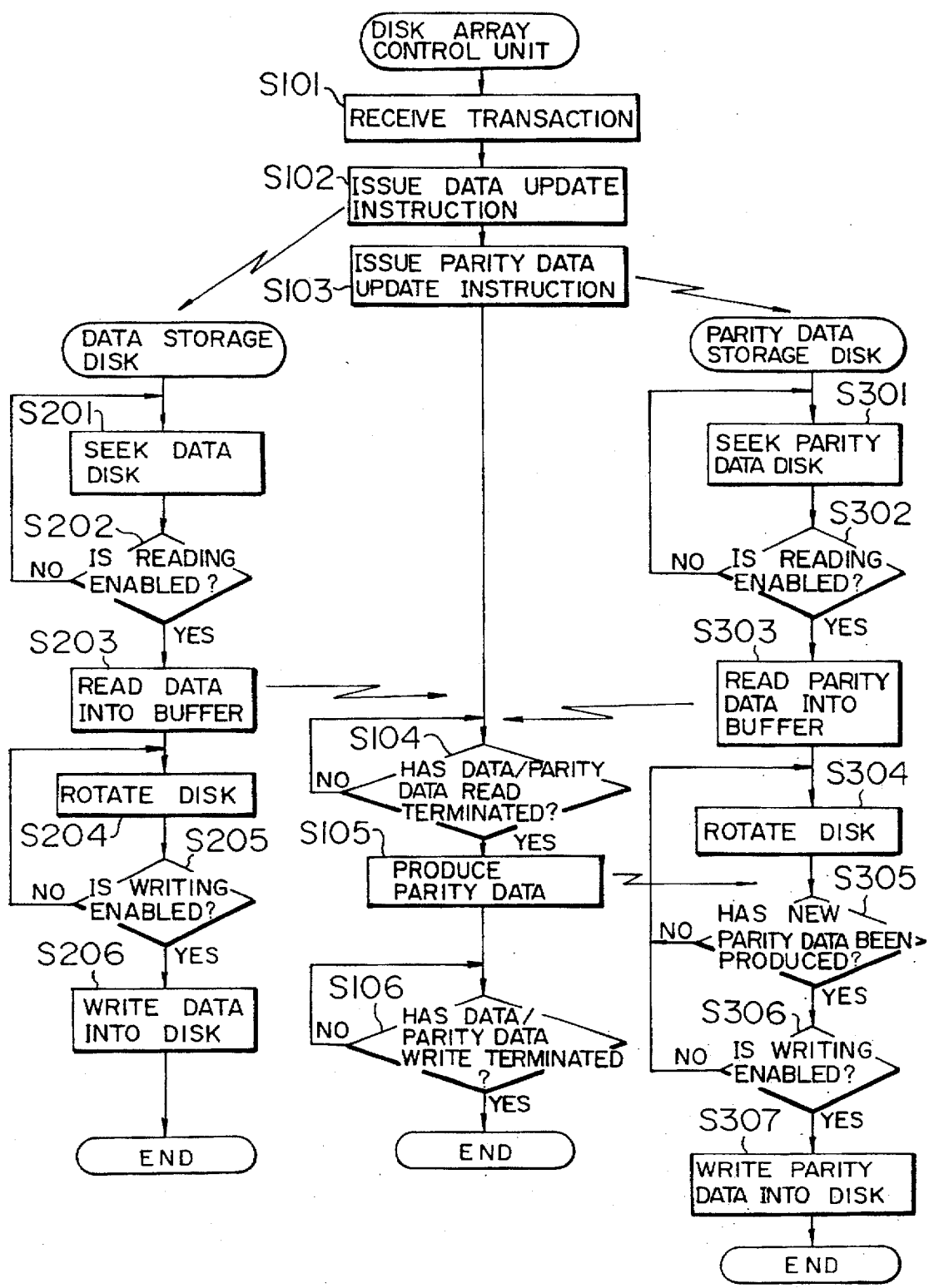
FIG. 7 is a flowchart showing data write implemented in the disk array system of the RAID level 5.
Figure 8:
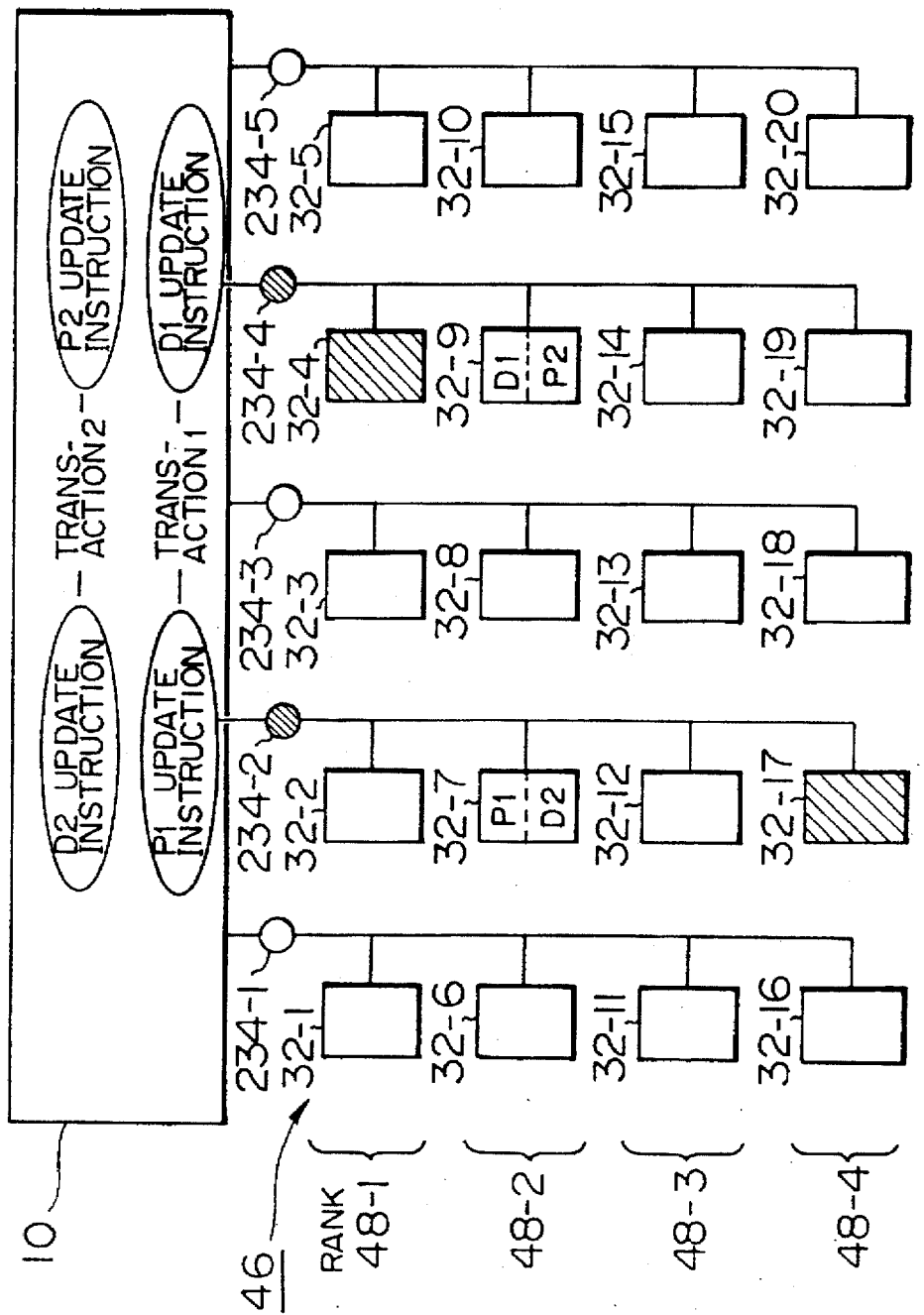
FIG. 8 is an explanatory diagram showing the fact that a deadlock will not occur in a single-port configuration.

The data storage form and parity-data production form adopted in the disk array system of the present invention corresponds to those in Level 5 RAID shown in FIG. 6. A new parity data must therefore be produced. This means that the data processor 244-1 must read old data and the parity-data processor 245-1 must read an old parity data. To be more specific, when the host computer 18 issues a host command or a processing request to the controller 238-1, the controller 238-1 produces a data update instruction and a parity-data update instruction and issues them to specified lower-level disk units. The data update instruction is composed of the following instructions:

Data update instruction=Data read instruction+Data write instruction

The parity-data update instruction is composed of the following instructions:

Parity-data update instruction=Parity-data read instruction (+)Parity-data production instruction(+)Parity-data write instruction The data processor 244-1 issues a data read instruction, which is included in the data update instruction, as one package instruction to an object disk, and thus accesses the disk unit for data read or data write.

The parity-data processor 245 first issues a write instruction to an object disk unit. When succeeding in reading an old parity bit, the parity-data processor 245 acknowledges that the data processor 244-1 has read old data, requests a parity-data producer 250-1 to produce a parity date. When a new parity data is produced, a parity-data write instruction is issued and the new parity data is written. The parity-data producer 250-1 produces a new parity data by calculating the exclusive-OR of old data data read from a write object disk unit, an old parity data read from the corresponding sector in other disk unit belonging to the same rank,, and new data given by the host computer 18. The disk array control unit 10-1 further includes a buffer 252-1 and an interface controller 254-1. The buffer 252-1 saves the new data, old data, and old parity data during data writing. The interface controller 254-1 accesses the disk units 32-1 to 32-n in a disk array. The disk array control unit 10-2 has the same configuration as that mentioned above of the disk array control unit 101. Furthermore, a communication control memory 256 realized with a dual-port RAM is included to enable transfer of control information between the disk array control units 10-1 and 10-2. The controllers 238-1 and 238-2 can transfer necessary information mutually by reading or writing the control memory 56.

The disk array 46 in FIG. 29 has only one rank consisting of disk units 32-1, 32-2, etc., and 32-n. The disk units 32-1 and 32-2 store data D1 and D2, and parity data P1 and P2 in such a manner that the conditions for a deadlock occurring when transactions 1 and 2 are submitted as two data write requests to the disk array control units 10-1 and 10-2 will not be satisfied. The control memories 240-1 and 240-2-in the disk array control units 10-1 and 10-2 have deadlock management tables 242-1 and 242-2.

FIG. 30 shows a deadlock management table according to the present invention. Information concerning transaction numbers, parity-data storage disk units, and data storage disk units is written in the deadlock management table. The information concerning each parity-data storage disk unit or data storage disk unit includes a disk unit number and a state of access.

Figure 9:
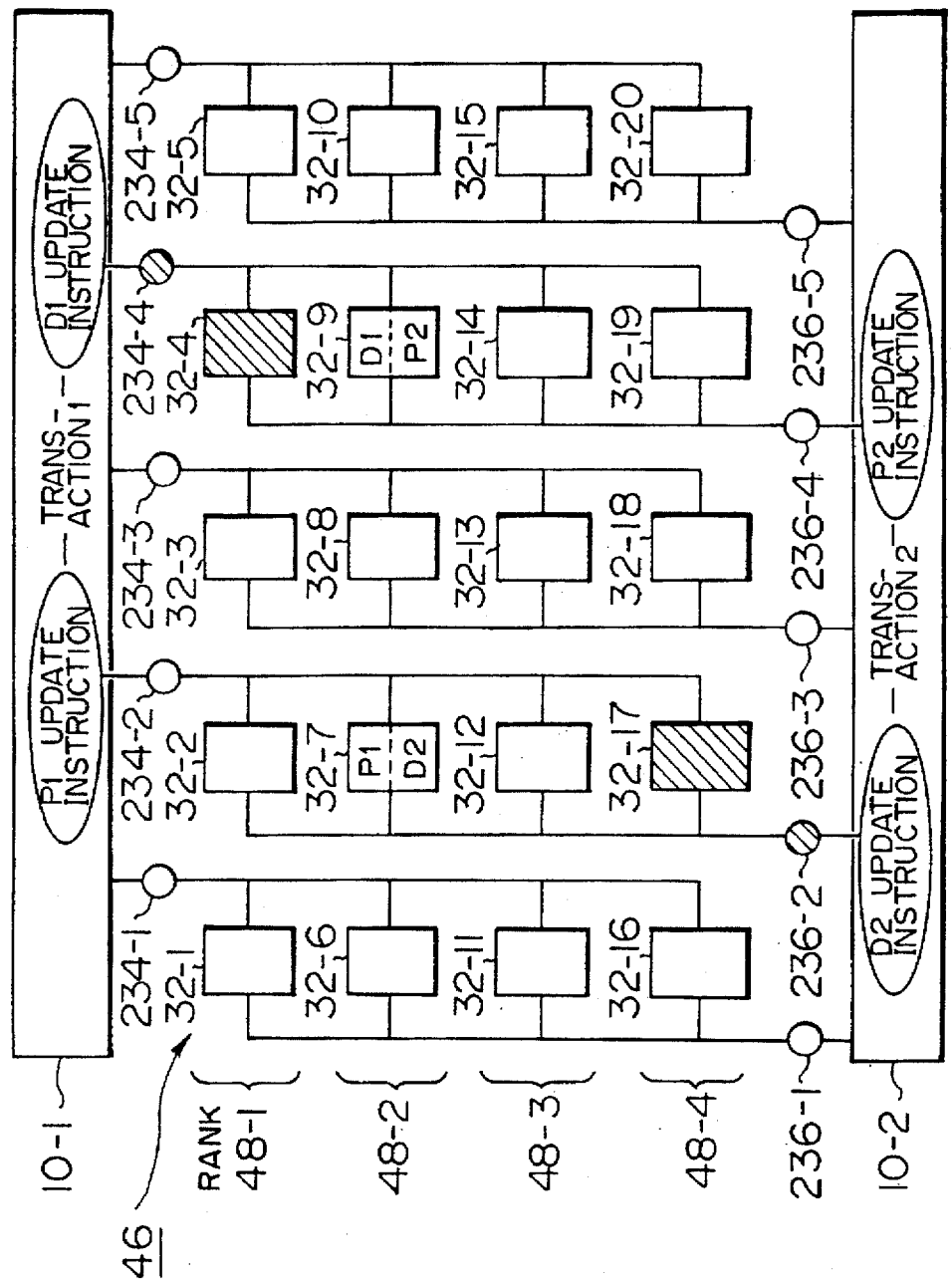
FIG. 9 is an explanatory diagram showing a dual-port configuration immediately before a deadlock occurs.
Figure 10:
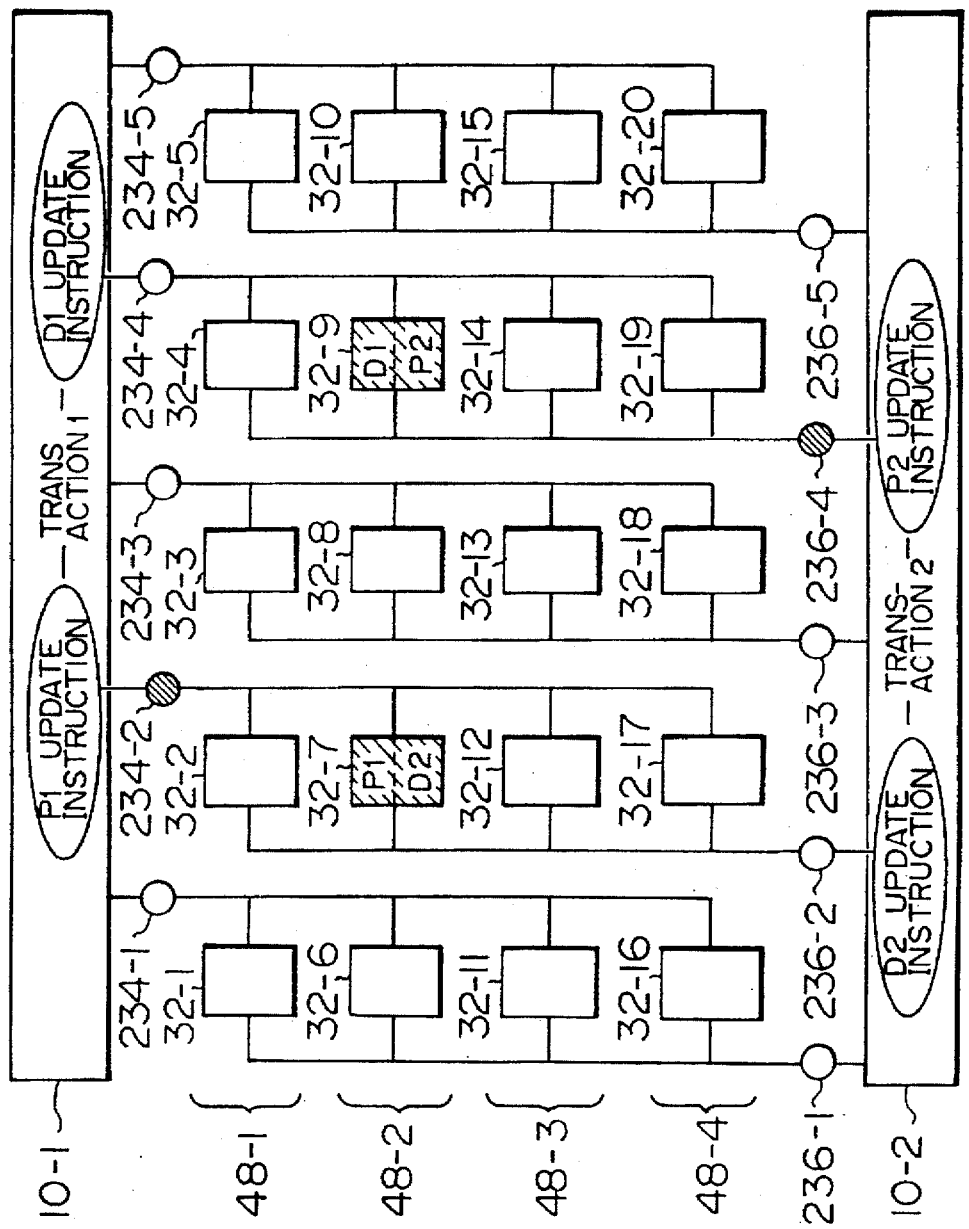
FIG. 10 is an explanatory diagram showing a dual-port configuration in which a deadlock occurs.
Figure 31:
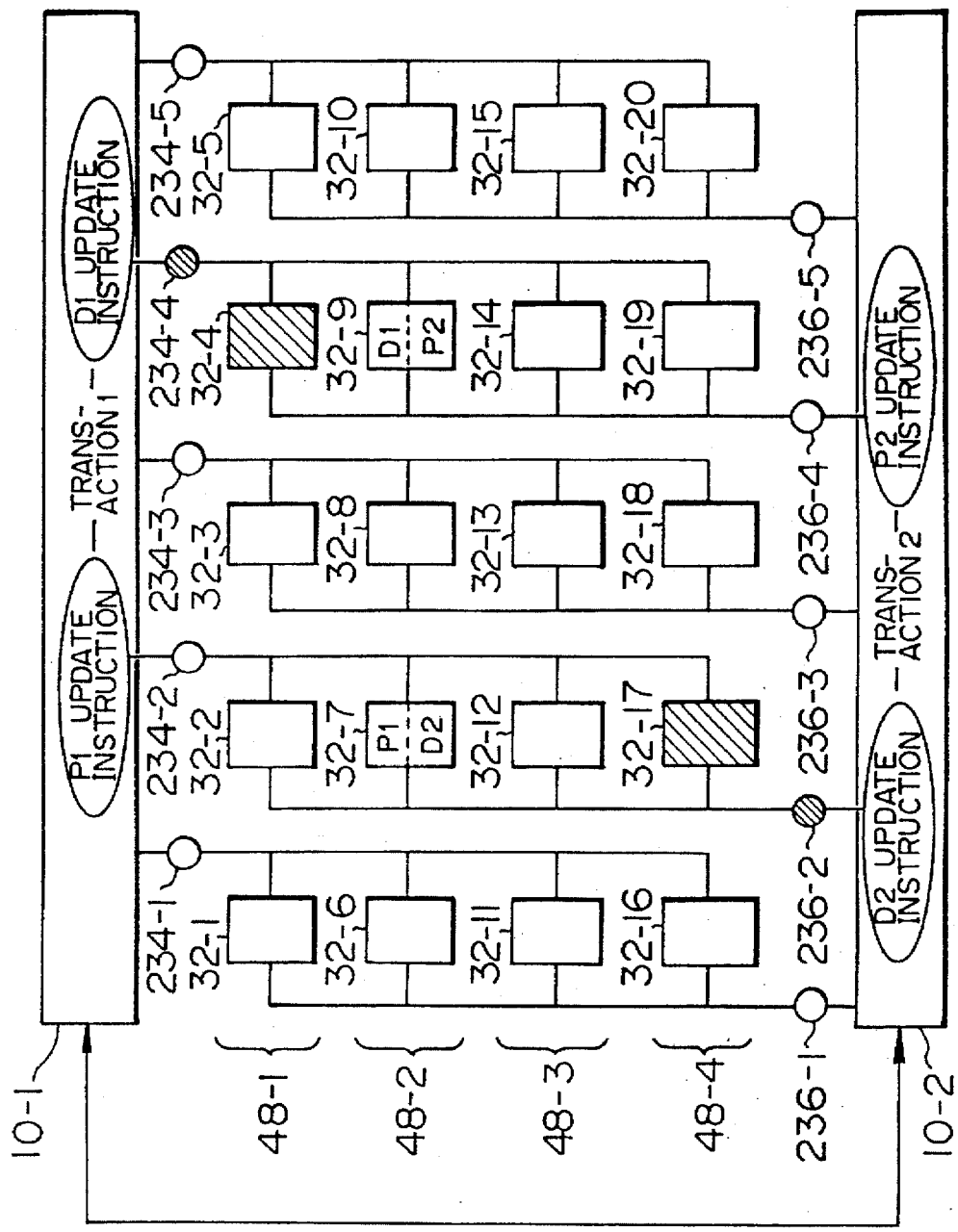
FIG. 31 is an explanatory diagram showing a deadlock management table according to the present invention.

FIG. 31 shows an operating state of a disk array system of the present invention immediately before a deadlock occurs. The state in FIG. 31 is the same as that in FIG. 9 except the fact that information can be transferred between the disk array control units 10-1 and 10-2. In the state in FIG. 31, the disk units 32-4 and 32-17 are used by two transactions handled by the disk array control units 10-1 and 10-2. Supposedly, the disk units 32-4 and 32-17 are allocated to parity data and new parity data are being written therein, while the disk units 32-1 and 32-2 are allocated to data and data have been written therein.

In this state, transactions 1 and 2 are submitted. The transaction 1 executes data write for the disk unit 32-9. The transaction 1 queues up a D1 update instruction for the disk unit 32-9 and a P1 update instruction for the disk unit 32-7. In the disk array control unit 10-2, the transaction 2, which is submitted immediately after the transaction 1, queues up a D2 update instruction for the disk unit 32-7 and a P2 update instruction for the disk unit 32-9.

In the operating state in FIG. 31, the deadlock management table according to the present invention has the contents of registration shown in FIG. 30. By referencing the deadlock management table, whether the conditions for occurrence of a deadlock are established can be determined or the state of access to a disk unit can be learned.

First Embodiment of Deadlock Suppression

Figure 32:
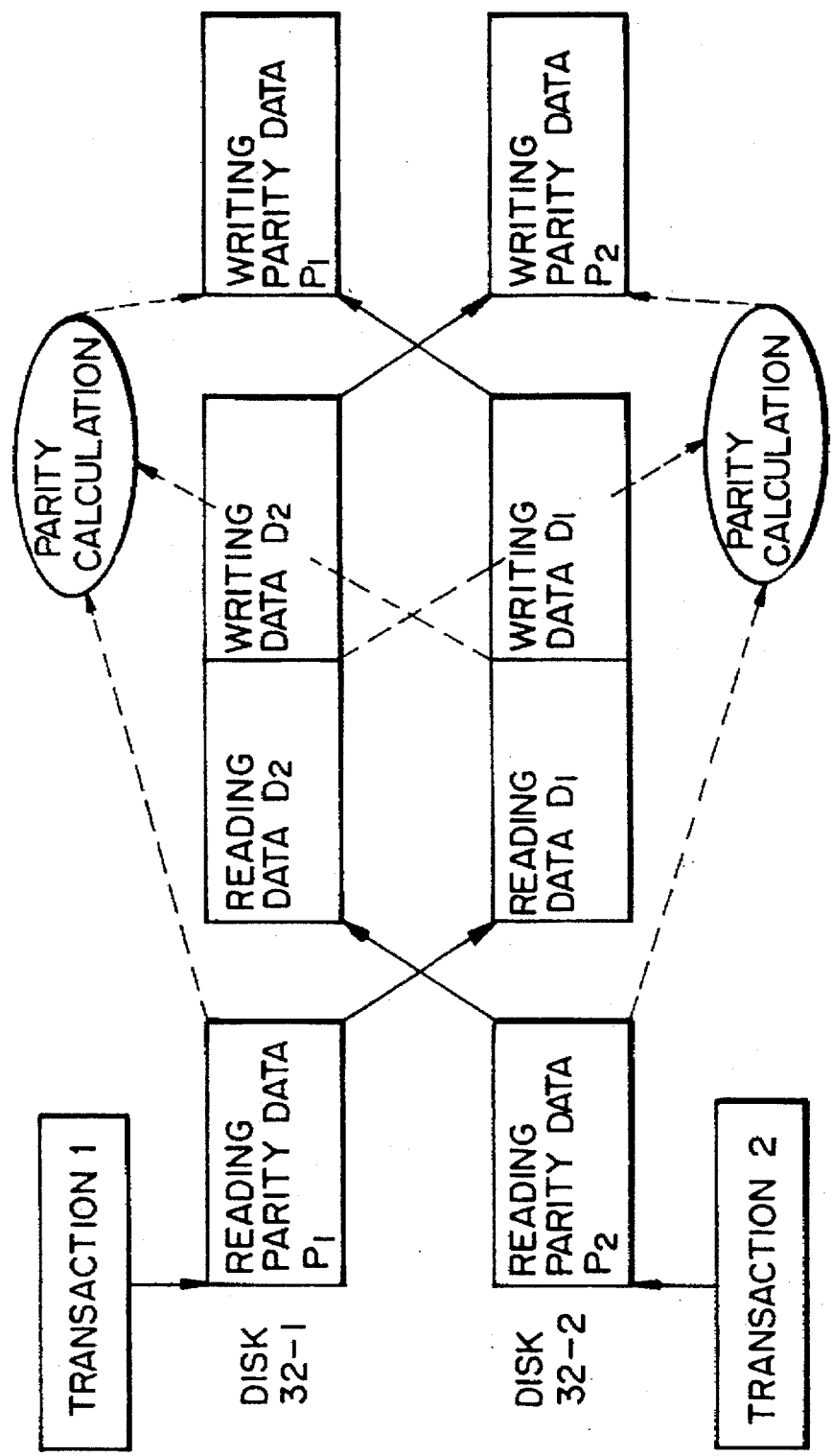
FIG. 32 is a timing chart showing the first embodiment of deadlock suppression according to the present invention.

The timing chart of FIG. 32 shows the first embodiment of deadlock suppression according to the present invention. A deadlock occurs when the consecutive transactions 1 and 2 are submitted to the disk array control units 10-1 and 10-2 and start updating the parity data P1 and P2 in the disk units 32-1 and 32-2 which store data D1 and D2 and the parity data P1 and P2 respectively. In the first embodiment, as shown in FIG. 32, after the parity data P1 and P2 are read from the disk units 32-1 and 32-2, the disk units 32-1 and 32-2 are released with Parity-data Read Completed. The transactions 1 and 2 then allow the respective partners to access (read and write) the data D1 and D2. After the data are updated through reading and writing, when the disk units 32-1 and 32-2 are released, the disk units are accessed again to write new parity data produced.

Figure 33:
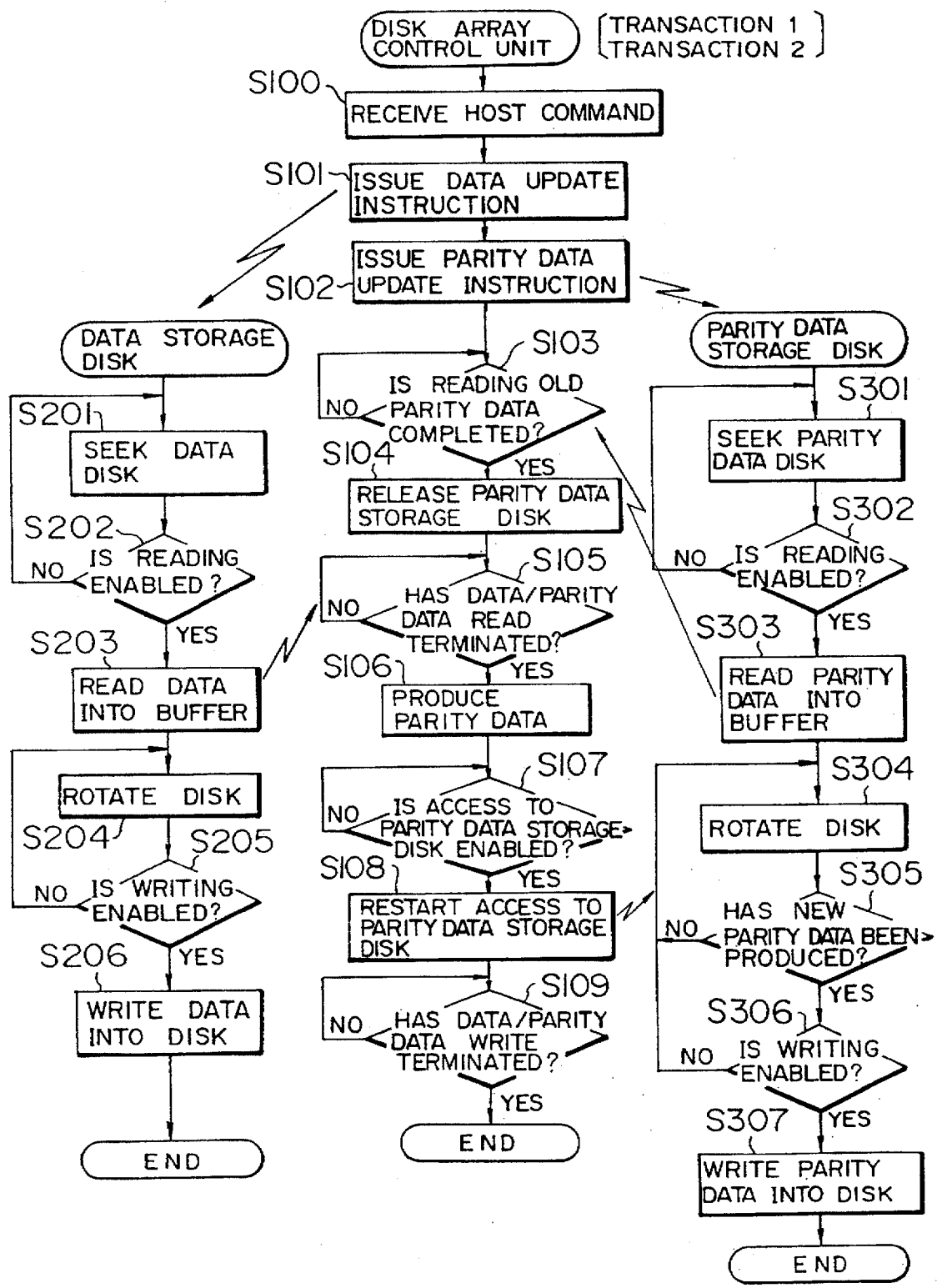
FIG. 33 is a flowchart showing the first embodiment of deadlock suppression according to the present invention.

The flowchart of FIG. 33 shows the processing of the first embodiment of deadlock suppression according to the present invention. The processing operations of a disk array control unit shown in FIG. 33 are executed in parallel by the disk array control units 10-1 and 10-2. First, the disk array control unit receives a write command from the host computer at a step S101. For example, the disk array control unit 10-1 receives a write command for the data D1 area in the disk unit 32-2. At a step S102, the disk array control unit 10-1 issues a data update instruction to the disk unit 32-2 designated with the logical ID in the write command. The issuance of a data update instruction will be detailed. That is to say, first, an access request is issued to the disk unit 32-2. If a busy reply is returned, the access request is queued up. When a ready reply is returned, an access right is granted and the disk unit 32-2 is interfaced. The data update instruction is thus transmitted to the disk unit 32-2.

Since the disk unit 32-2 and sector to be subjected to data write have been specified, a parity-data update instruction is issued to the disk unit 32-1, which stores a parity data in the corresponding sector, at a step S103. The parity-data instruction is transmitted to the disk unit 32-1 in the same manner as the data update instruction. That is to say, first, an access request is issued to the disk unit 32-1. If the disk unit 32-1 returns a busy reply, the access request is queued up. When the disk unit 32-1 returns a ready reply, an access right is granted. Thus, the parity-data update instruction is transmitted to the disk 32-1.

The data storage disk unit activated with the data update instruction follows steps S201 to S206. At a step S201, seek is executed to position the head at the leading address of a specified write object block. At a step S202, seek terminates, and read terminates, either. At a step S203, old data is read and buffered in the disk array control unit. At a step S204, the disk unit is rotated by one turn. At a step S205, write is enabled. At a step S206, new data is written in the disk unit. The sequence of operations is thus completed. The disk unit in which data has been written is then released.

For the parity-data storage disk unit activated with the parity-data update instruction, seek is started at a step S301. When the head is positioned at the leading address in a read object block, read is enabled at a step S302. At a step S303, a parity data is read and buffered in the disk array control unit. At a step S304, the disk unit is rotated by one turn. At a step S305, it is checked if a new parity data has been produced. When old data and parity data have been read, a new parity data is produced and transferred to the disk array control unit. The disk array control unit then passes control to a step S306. When the head is positioned at the leading address of the block due to the rotation of the disk unit at the step S304, write is enabled at the step S306. The parity data is then written in the disk unit at a step S307. The parity-data storage disk unit is then released.

The fundamental operations of the data storage disk unit and parity-data storage disk unit are identical to the conventional ones. In the first embodiment, the disk array control unit reads a parity data from a parity-data storage disk unit at the step S303, buffers the parity bit, and then releases the disk unit forcibly. After a parity-data update instruction is issued, the disk array control unit monitors at the step S103 to see if reading an old parity data is completed. After an old parity data is read and buffered, control is passes to a step S104. The parity-data storage disk unit is released forcibly. When the parity-data storage disk unit is released forcibly, since the data update instruction of the transaction 2 has been queued up in the disk array control unit 10-2 concurrently, the transaction 2 is granted an access right, and gains access to the disk unit using the data update instruction.

When the transaction 2 terminates data update, the disk unit is released. The disk unit array control unit monitors at a step S107 to see if the parity-data storage disk unit is accessible. If the parity-data storage disk unit becomes accessible, access to the disk unit is restarted at a step S108. Processing is rerun in a parity-data storage disk unit, which starts at a step S304. Meanwhile, the disk array control unit determines at a step S105 whether reading old data and parity data is completed. At a step S106, a new parity data is produced. When access to the parity-data storage disk unit is restarted at the step S108, the new parity data is sent from the disk array control unit. When write is enabled through steps S305 to S306, the new parity data can be written immediately at a step S307.

After restarting access to the parity-data storage disk unit at the step S108, the disk array control unit monitors at a step S109 to see if writing the new data and parity data is completed. When writing both the data and parity data is completed, the disk array control unit reports Write Completed to the host computer. The sequence of operations is thus completed.

Second Embodiment of Deadlock Suppression

Figure 34:
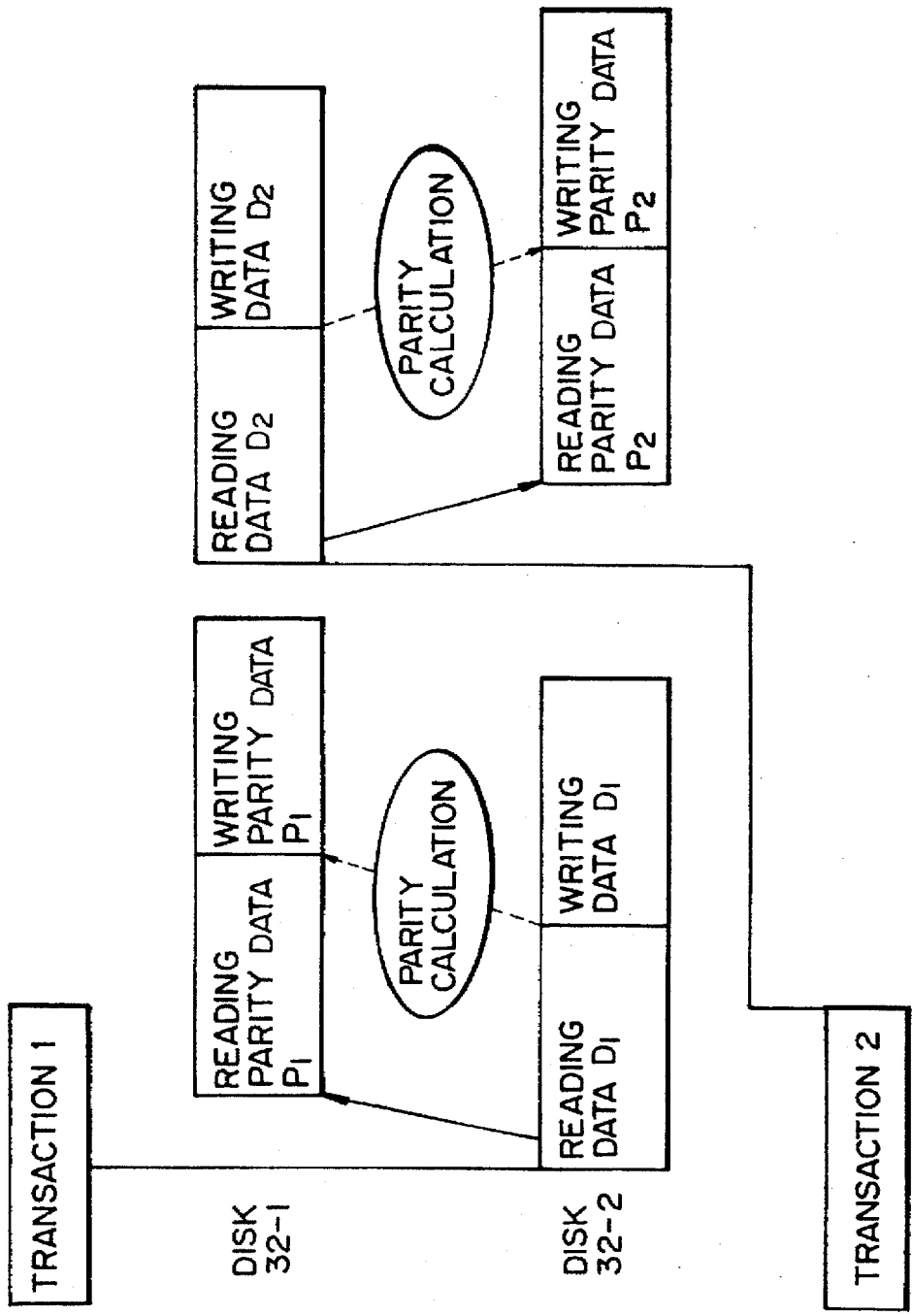
FIG. 34 is a timing chart showing the second embodiment of deadlock suppression according to the present invention.

The timing chart of FIG. 34 shows the second embodiment of deadlock suppression according to the present invention. In the second embodiment, whether or not the conditions for occurrence of a deadlock are established, when a transaction is submitted, access to a data storage disk unit will be succeeded by access to a parity-data storage disk unit. For example, when the transaction 1 is submitted, access to the data storage disk unit 32-1 is started, and then access to the parity-data storage disk unit 32-1 is started. The same applies to the transaction 2. Specifically, when it comes to the transaction 1, access to the parity-data storage disk unit 32-1 is not enabled until it is found that the data storage disk unit 32-2 is accessible.

Figure 35:
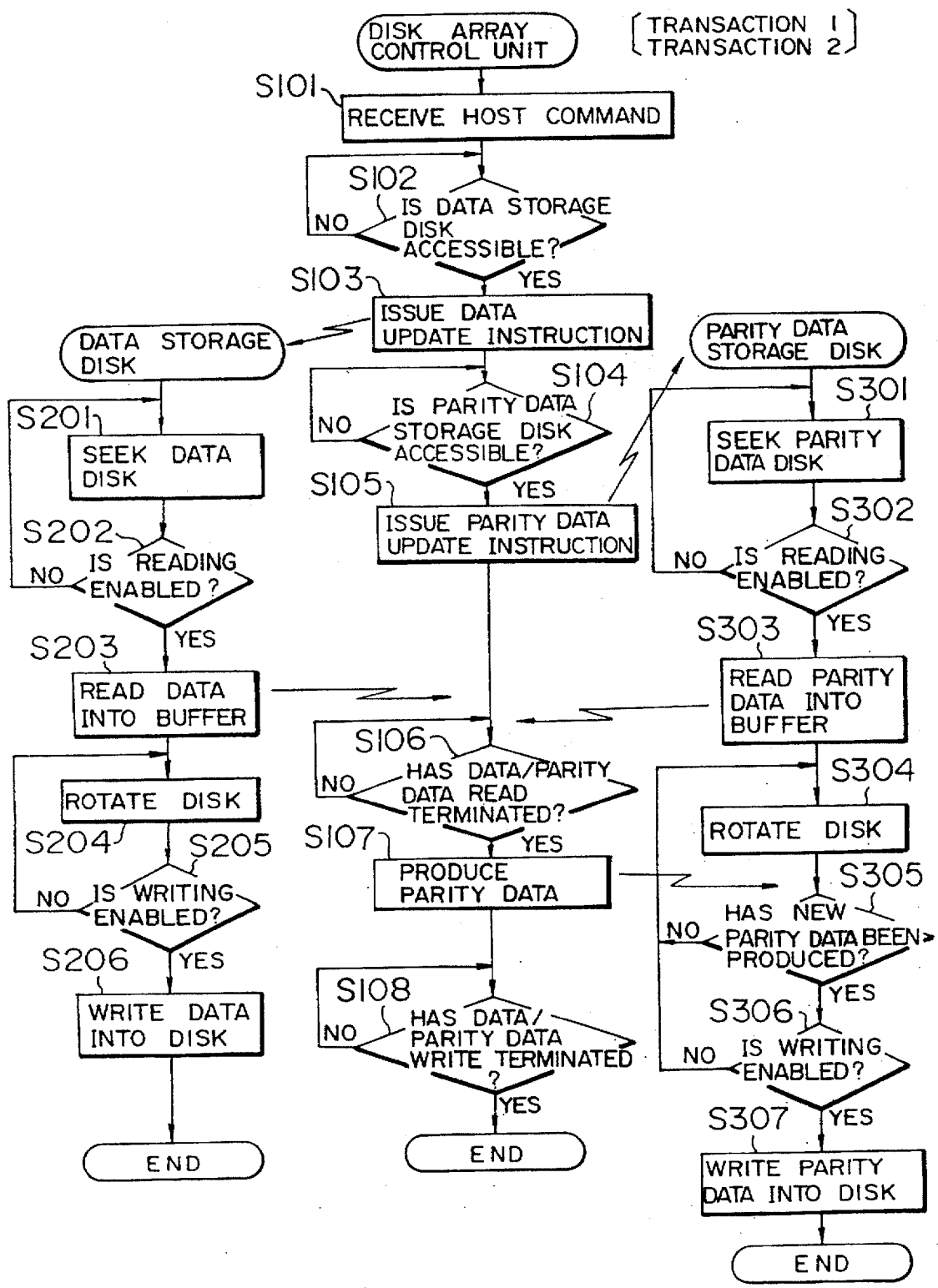
FIG. 35 is a flowchart showing the second embodiment of deadlock suppression according to the present invention.

The flowchart of FIG. 35 shows the second embodiment of deadlock suppression according to the present invention. The disk array control unit receives a host command at a step S101. At a step S102, it is determined whether the data storage disk unit becomes accessible. After the data storage disk unit returns a ready reply, when an access point becomes available, control is passed to a step S103. A data update instruction is issued to the data storage disk unit. It is then written in the corresponding area of a state of access in the deadlock management table in FIG. 30 that access is started. At a step S104, it is checked if a parity-data storage disk unit is accessible. When a ready reply is returned and an access right is granted, control is passed to a step S105. A parity-data update instruction is then issued. Thereafter, the disk array control unit waits at a step S106 until reading old data bits and parity data is completed, and produces a new parity data at a step S107. Finally, it is confirmed that the new data and parity data have been written. The sequence of operations is thus completed. The processing operations in a data storage disk unit and a parity-bit storage disk unit are identical to those in the first embodiment except that a disk unit is not released intermediately. When data write and parity-data write terminate, the corresponding state of access in the deadlock management table in FIG. 30 is rewritten to Write Completed.

Third Embodiment of Deadlock Suppression

Figure 36:
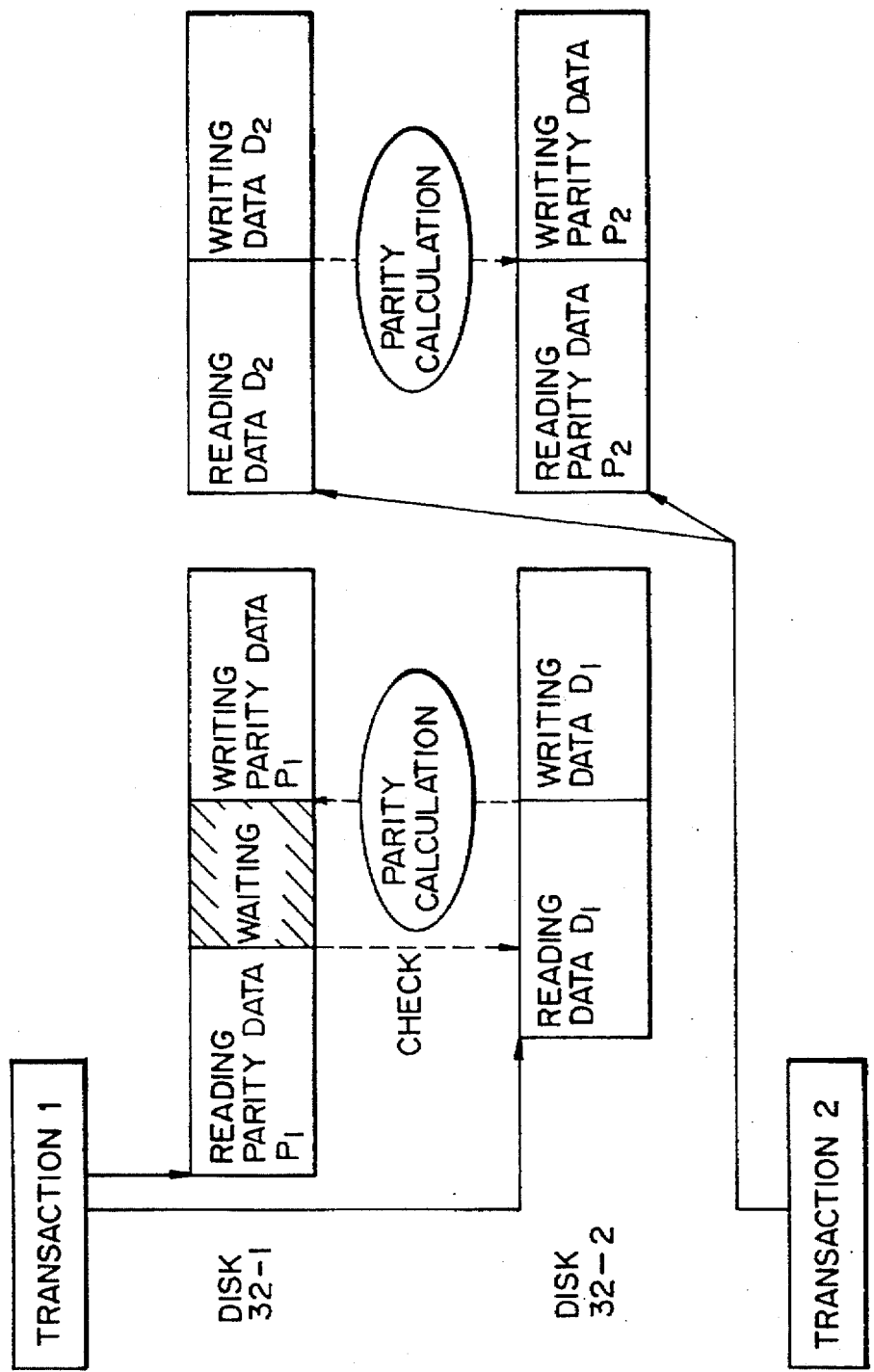
FIG. 36 is a timing chart showing the third embodiment of deadlock suppression according to the present invention.

The timing chart of FIG. 36 shows the third embodiment of deadlock suppression according to the present invention. In the third embodiment, after the preceding transaction 1 reads a parity data P1 from the disk unit 32-1, the progress of access to the data storage disk unit 32-2 obtained by the transaction 1 is referenced. When the data storage disk unit 32-2 is in use, after a short period of time elapses, old data could be read from the data storage disk unit 32-2 and a new parity data could be produced. The transaction 1 therefore retains the exclusive use of the parity-data disk unit 32-1, executes parity-data write, and then releases the disk unit 32-1.

Figure 37:
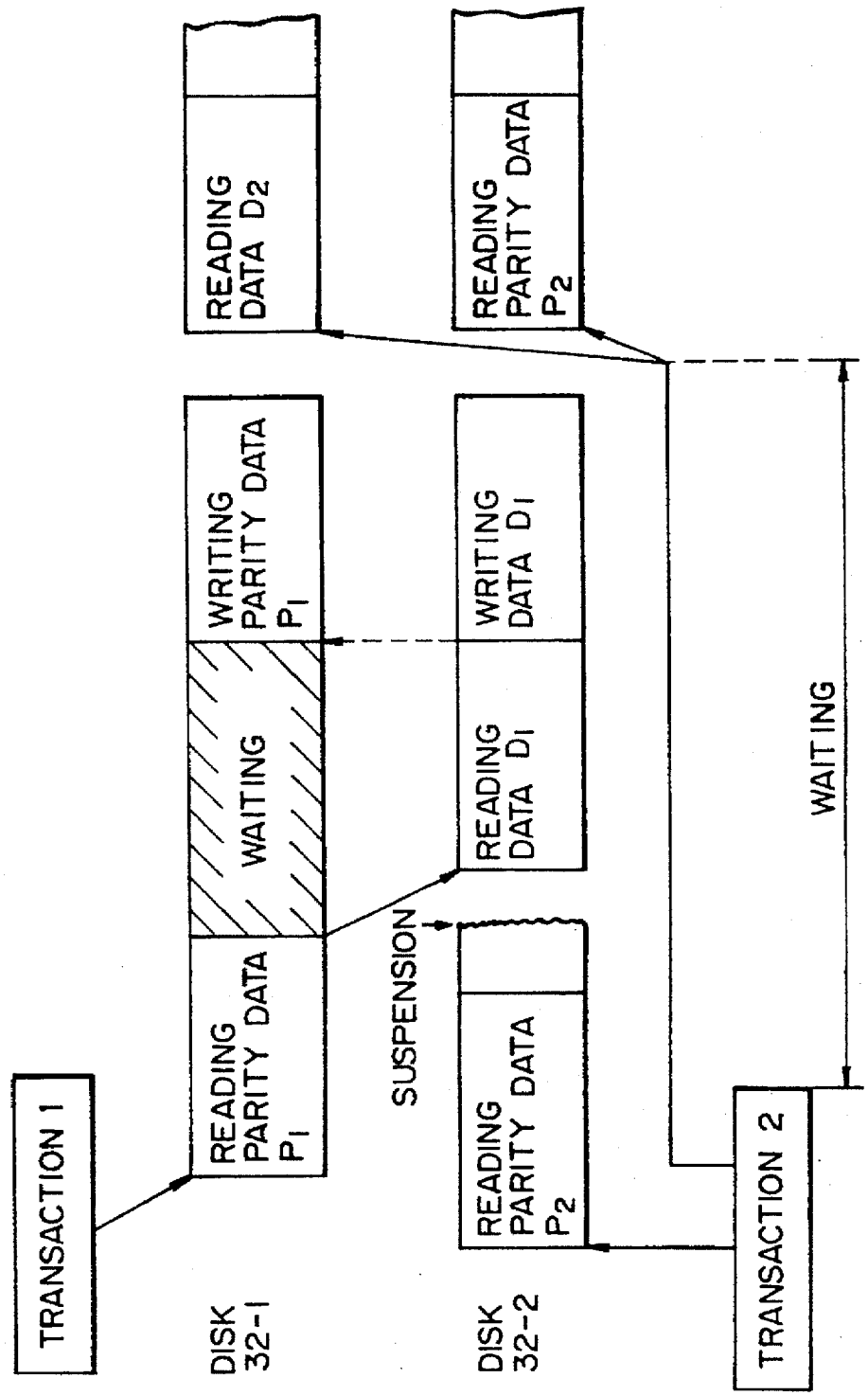
FIG. 37 is a timing chart showing another deadlock suppression in the third embodiment of the present invention.

In the timing chart of FIG. 37, the transaction 1 is reading the parity data P1 from the data storage disk unit 32-1, the succeeding transaction 2 is using the disk unit 32-2 exclusively, and an update instruction for updating data D1 is queued up. In this state, the conditions for occurrence of a deadlock are established. The exclusive use of the disk unit 32-2 by the succeeding transaction 2 is released forcibly, and the preceding transaction 1 is allowed to terminate access for data update.

Figure 38:
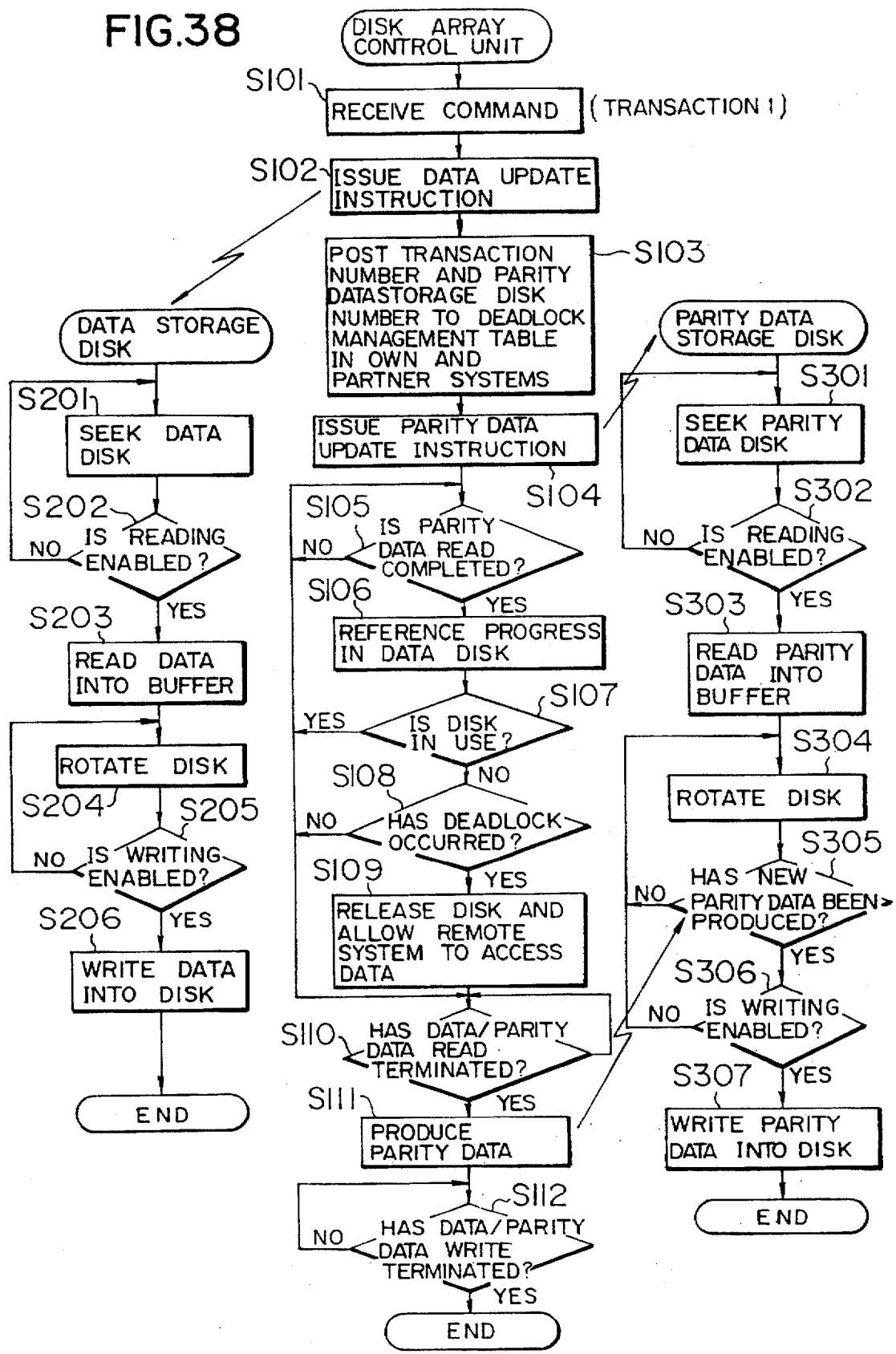
FIG. 38 is a flowchart showing the third embodiment of deadlock suppression according to the present invention.

The flowchart of FIG. 38 shows the third embodiment of deadlock suppression according to the present invention. The disk array control unit shown in FIG. 38 handles the preceding transaction 1. At a step S101, the disk array control unit receives a command. At a step S102, the disk array control unit issues a data update instruction and accesses a data storage disk unit for data update. At a step S103, a transaction number and a disk unit number of a parity-data disk unit are posted to each of the own deadlock management table and the deadlock management table in the partner disk array control unit handling the succeeding transaction 2, and then registered therein. By posting a transaction number and a disk unit number, it can be determined on the basis of the deadlock management table whether the conditions for occurrence of a deadlock are established. At a step S104, a parity-data update instruction is issued to the parity-data storage disk unit. At a step S105, it is monitored whether reading a parity data is completed. When an old parity data is read and buffered, control is passed to a step S106. The deadlock management table is then referenced to see the progress of access to a data storage disk unit. In this state, when the data storage disk unit is accessed according to the data update instruction issued at the step S102; that is, seek is executed at a step S201, read is enabled at a step S202, or read data is buffered at a step S203, if only a short period of time elapses, the disk array control unit could obtain old data. While retaining the control of the parity-data storage disk unit, the disk array control unit passes control to a step S110. It is then confirmed that old and parity data have been read. A new parity data is produced and sent to the parity-data storage disk unit at a step S111. The parity data is then written at steps S304 to S307. The parity-data storage disk unit is then released. When the parity-data storage disk unit is released, a succeeding transaction is granted an access right for a disk unit to which a data update instruction is issued. A deadlock will therefore not occur.

The data update instruction of the transaction 1 for a data storage disk unit may be queued up at the step S107, because the disk unit is used exclusively for a parity-data update instruction by the succeeding transaction 2. In this case, the deadlock management table is referenced at a step S108 to see if the conditions for a deadlock are established. If the conditions for a deadlock are established, control is passed to a step S109. The parity-data storage disk unit is temporarily released from the succeeding transaction 2 so that the transaction 1 can execute a data update instruction that has been enqueued up. When the transaction 2 releases the disk unit, the transaction 1 is granted an access right to execute the data update instruction which has been issued at the step S102 and then queued up. Thus, data update is executed for the data storage disk unit. When the transaction 1 terminates data update the data storage disk unit is released. The transaction 2, from which the disk unit is released at the step S109, restarts parity-data update; that is, produce and write a parity data.

Fourth Embodiment of Deadlock Suppression

Figure 39:
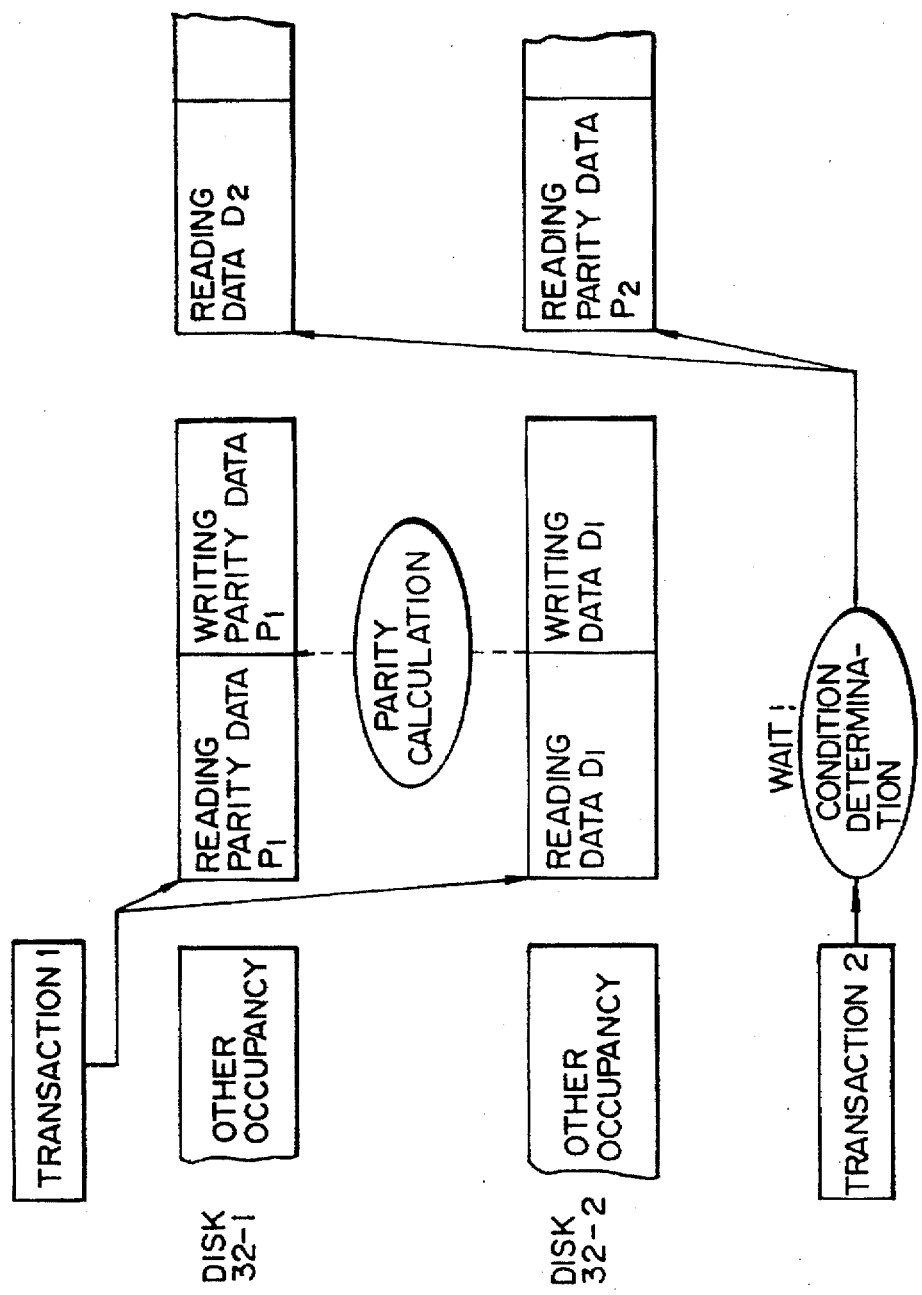
FIG. 39 is a timing chart showing the fourth embodiment of deadlock suppression according to the present invention.

The timing chart of FIG. 39 shows the fourth embodiment of deadlock suppression according to the present invention. In the fourth embodiment, before the succeeding transaction 2 accesses the parity-data storage disk unit 32-2, it is determined whether the conditions for a deadlock are established. If the conditions are established, the progress of access to the data storage disk unit 32-1 obtained by the preceding transaction 1 is referenced. Until the transaction 1 starts data access, the transaction 2 is disabled from executing parity-data access.

In short, the third embodiment shown in FIGS. 36, 37, and 38 provides the processing for the disk array control unit handling the preceding transaction 1. The fourth embodiment in FIG. 39 provides the processing for the unit array control unit handling the succeeding transaction 2.

Figure 40:
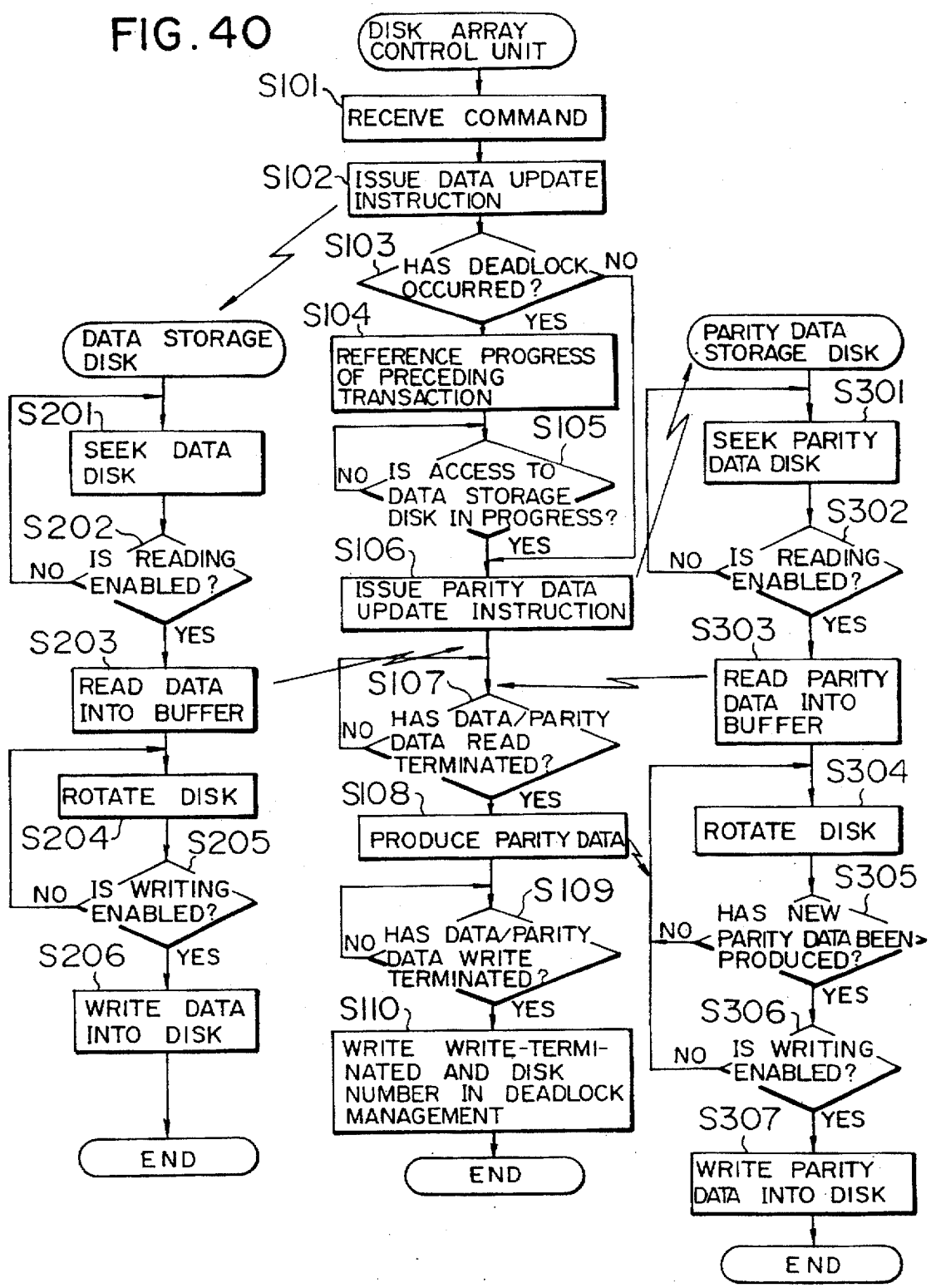
FIG. 40 is a flowchart showing the fourth embodiment of deadlock suppression according to the present invention.

The flowchart of FIG. 40 shows the fourth embodiment of deadlock suppression according to the present invention. First, at a step S101, the disk array control unit receives a command from the host computer. When the succeeding transaction 2 is submitted, a data update instruction is issued at a Step S102. Access to a data storage disk unit is then started. At a step S103, the deadlock management table is referenced to see if the conditions for a deadlock are established. If the conditions for a deadlock are established, the progress of data access made by the preceding transaction 1 is referenced at a step S104. If the preceding transaction 1 has not started data access and the data update instruction has been queued up, the disk array control unit waits until data access starts. When the preceding transaction 1 starts data access, the succeeding transaction 2 is enabled to execute parity-data access. A parity-data update instruction is issued at a step S106, whereby parity-data update is started for a parity-data storage disk unit. Thereafter, it is confirmed at a step S107 that old data bits and parity data have been read out. A new parity data is then produced at a step S108. When it is confirmed at a step S109 that data bits and a parity data have been written, Write Completed and a disk unit number are entered in the deadlock management table at a step S110. The sequence of operations are thus completed.

Fifth Embodiment of Deadlock Suppression

Figure 41:
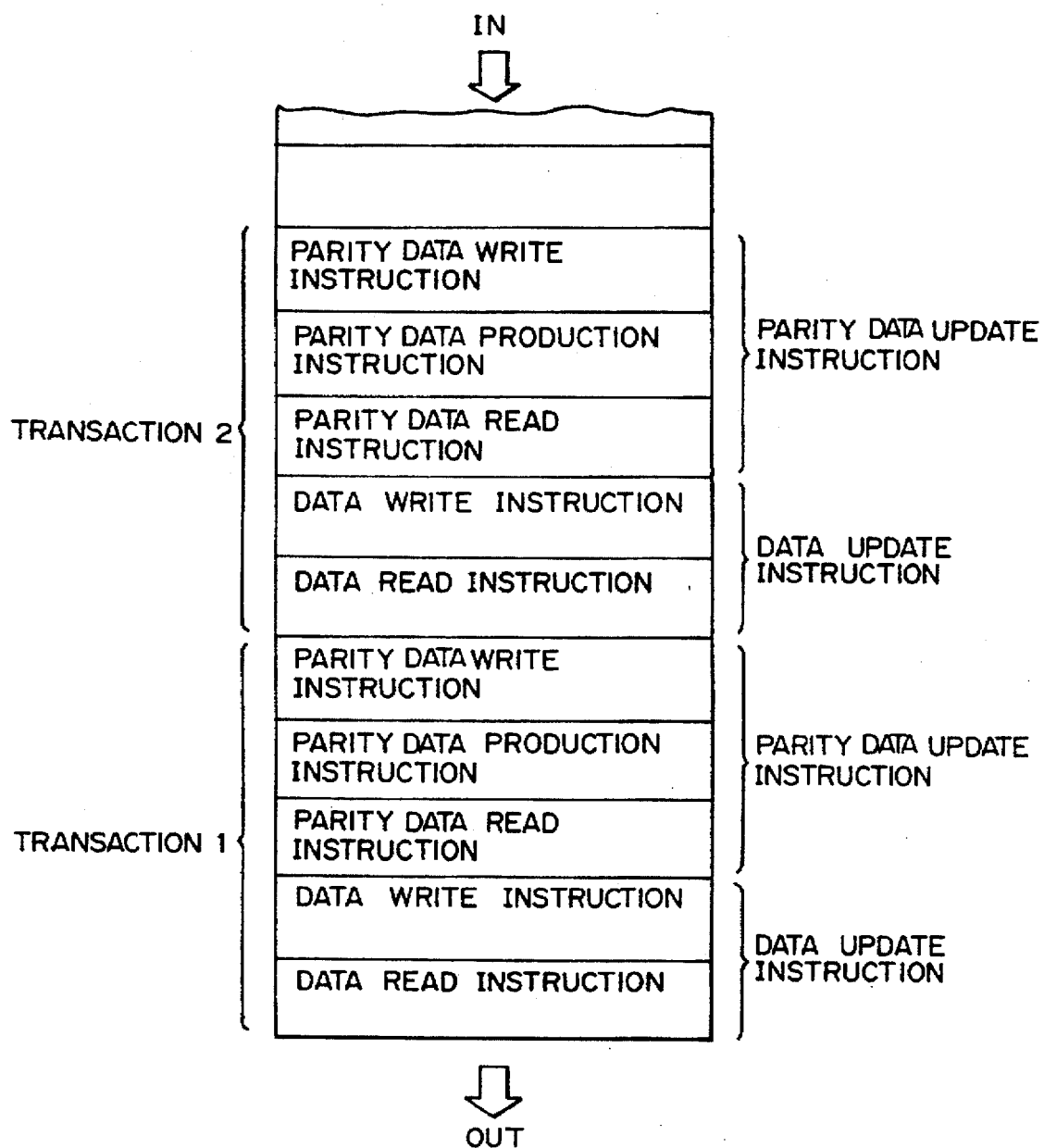
FIG. 41 is an explanatory diagram showing a control memory used for the fifth embodiment of deadlock suppression according to the present invention.

FIG. 41 shows a first-in first-out command queue in the disk unit management table used for deadlock avoidance of the fifth embodiment according to the present invention. In the fifth embodiment of the present invention, before disk units are allocated to all transaction requests, all the requests are placed in a first-in first-out (hereinafter, FIFO) command queue in the order in which the access requests for all the disk units are issued.

In FIG. 41, the FIFO queue stores data update instructions and parity-data update instructions for realizing the requests of the transactions 1 and 2. The data update instruction consists of two access instructions: a data read instruction and a data write instruction. The data read instruction and data write instruction are stored sequentially. The parity-data update instruction consists of three access instructions: a parity-data read instruction, a parity-data production instruction, and a parity-data write instruction. These instructions are arranged sequentially. The access instructions placed in the FIFO command queue in FIG. 15 are fetched in the order in which they are queued up. With a fetched access instruction, a corresponding disk unit is accessed. Contention for the same disk unit will therefore not occur between the data update instruction and parity-data update instruction issued by the transactions 1 and 2. A deadlock can therefore be prevented reliably.

According to the present invention, a disk array system having a multi-rank dual-port configuration can prevent or avoid a deadlock occurring when contention occurs because both parity-data update and data update are executed for the same disk unit by difference transactions. The disk array system can therefore execute input and output appropriately and provide the improved throughput.

The hardware shown in FIG. 28 includes four ranks each consisting of five disk units. Each of the disk units are connected over two access buses owing to the dual-port configuration. The present invention is not limited to this configuration. The number of disk units per rank, the number of ranks, or the number of access ports can be set arbitrarily according to the purpose of use.

Setting a RAID Level and a Grouping Pattern using an External Terminal

Figure 42:
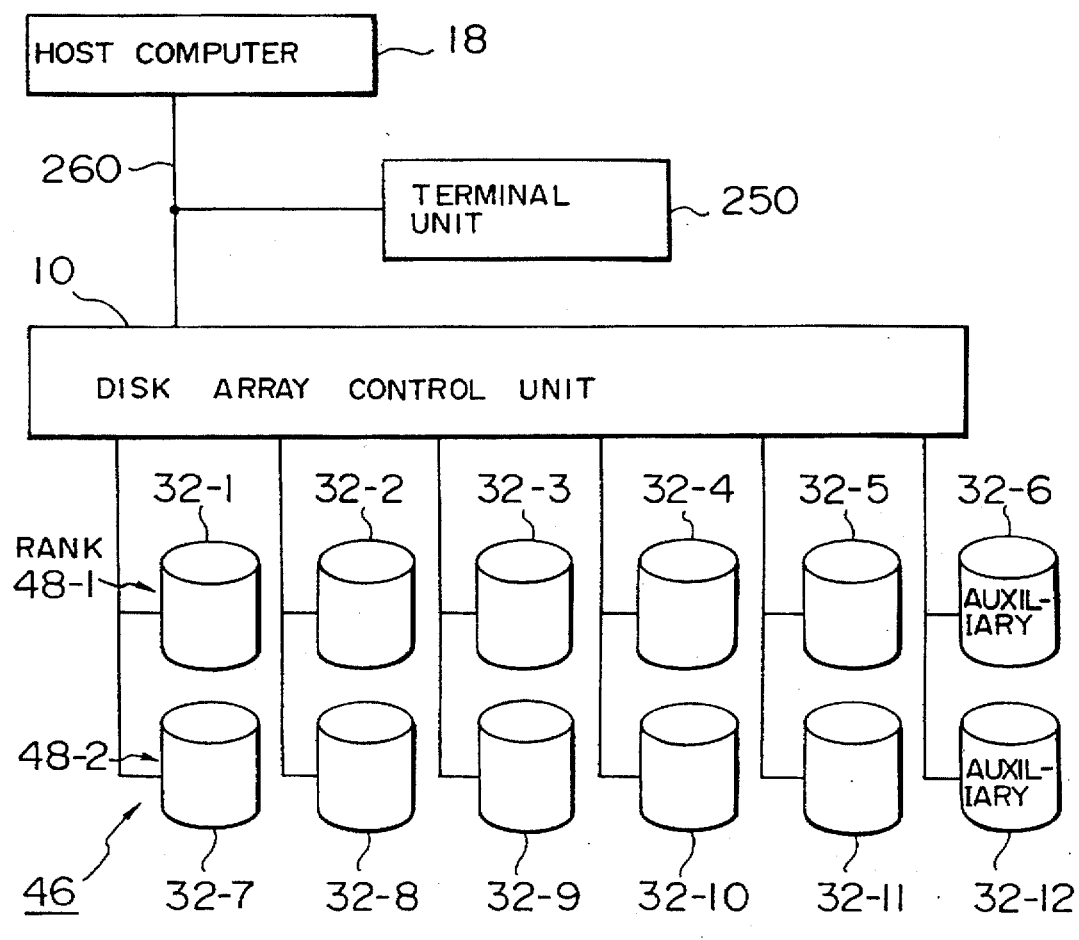
FIG. 42 is a block diagram showing an embodiment in which a terminal is used to group disk units in a disk array.

FIG. 42 is a block diagram showing another embodiment of a disk array system of the present invention. In this embodiment, a terminal unit 25 such as a personal computer is connected over an interface bus 260 extending from the host computer 18 to the disk array control unit 10. At the startup of the disk array control unit 10, the terminal unit 250 is used to set a so-called RAID level and a grouping pattern based on which multiple disk units 32-1 to 32-12 included in the disk array 46 are grouped. An SCSI is employed as the interface bus 260. Using the terminal unit 250, a RAID level is set according to the situation of data processing by the host computer 18. For example, when the host computer 18 will handle a large amount of data, the third RAID level is adopted. When the host computer 18 performs transaction processing in which a relatively small amount of data is handled, the fifth RAID level is adopted. As for a grouping pattern, the terminal unit 250 is used to enter an instruction saying that, for example, the disk units 32-1 to 32-5 be grouped together to form the rank 48-1 and that the disk units 32-6 to 32-10 be grouped together to form the rank 48-2.

The topology in FIG. 42, which makes it possible to set a RAID level and a grouping pattern in the disk array control unit 10 using the terminal unit 250, can also apply to the configuration in FIG. 11 or 28.

What is claimed is:

1. A disk array system comprising:
   disk array means having a plurality of disk units for storing data and for parity storage;
   first writing means for individually accessing said plurality of disk units, dividing said data into data blocks of predetermined lengths and writing said divided data blocks into said disk units when a length of said write data amount supplied by an upper apparatus is less than a specified value; and
   second writing means, which operates in one mode when all of said plurality of disk units are accessible, by accessing said plurality of disk units in parallel, dividing said data into data blocks of predetermined lengths, generating redundant data using said divided data blocks and data which is stored in parallel in the direction in which said disk units are lined up, and writing said divided data blocks and generated redundant data into said disk units when said length of said write data amount supplied by said upper apparatus is greater than a specified value; and said second writing means operates in another mode, when any of said plurality of disk units are inaccessible for writing said divided data in said plurality of disk units in parallel, by dividing said write data into data blocks of predetermined lengths according to a storing format in which the data blocks are stored across said plurality of disk units, generating redundant data using said divided data block, and then accesses said disk units individually to write said divided data blocks and said generated redundant data therein, when said length of said write data amount supplied by said upper apparatus is greater than a specified value.

2. A disk system according to claim 1, wherein said first writing means reads data from a write-scheduled location in a write object disk unit and redundant data from a location in another disk unit corresponding to said write-scheduled location, generates redundant data, and then writes said divided data and said generated redundant data in said plurality of disk units individually.

3. A disk array system according to claim 1, wherein when said plurality of disk units are all accessible, said second writing means generates redundant data using said divided data which is stored in the direction in which said plurality of disks are lined up, and then writes said divided data and said generated redundant data in said plurality of disks in parallel.

4. A disk array system according to claim 3, wherein said second writing means writes said divided data and said generated redundant data in parallel into a plurality of disk units of a first rank, and said first writing means individually accesses a plurality of disk units of a second rank to write said divided data and said generated redundant data, said divided data and said generated redundant data having been read out after written therein.

5. A disk array system according to any one of claims 1, 2, 3 or 4, wherein when said first writing means or second writing means writes to a plurality of disk units, said generated redundant data is written to said disks units in a distributed manner.

6. A disk array system according to any one of claims 1, 2, 3, or 4, wherein when said first writing means or said second writing means writes to a plurality of disk units, said generated parity data is written to a dedicated disk unit.

7. A disk array system according to any of claims 1, 2, 3, or 4, wherein when a parity bit is used as generated redundant data, said first writing means produces a new parity bit by calculating an exclusive-OR of data bits and a parity bit read from said plurality of disk units, and said second writing means produces a new parity bit by calculating an exclusive-OR of a plurality of data bits to be written in the direction in which said plurality of disks units are lined up.

8. A disk array system comprising:

a disk array means in which a plurality of disk units are connected to a corresponding plurality of access ports to define a rank, said disk array means including at least two ranks, wherein a plurality of sector data blocks are obtained by dividing write data from an upper apparatus into predetermined lengths, further wherein a plurality of parity data blocks are generated from said sector data blocks, and whereby every sector position in said plurality of disk units in each of said ranks stores either one of said sector data blocks or one of said parity data blocks;

a first writing means selectively operating when a data amount of the write data from said upper apparatus is less than or equal to a specified value, said first writing means for dividing said write data into a plurality of sector data blocks in a sector direction of the disk unit as a write target, and wherein prior to writing each of said sector data blocks, said first writing means reads out a sector data block at a write sector position of the disk unit as a write target and for reading out a parity data block at a write sector position stored in another disk unit, generates a new parity data block, and subsequently individually writes a new sector data block and a new parity data block into said corresponding disk units; and a second writing means selectively operating when a data amount of the write data from said upper apparatus is greater than said specified value, wherein a mode of operation of said second writing means operating depends on whether each of said plurality of disk units is in a busy state or an accessible state;

wherein if at least one of said plurality of disk units is in a busy state, said second writing means divides said write data into sector data blocks across said plurality of disk units, generates new parity data for said sector data blocks at a same sector level, and subsequently extracts said sector data blocks from within a disk unit and said corresponding parity data block, and then individually writes said sector data blocks into said corresponding disk units;

wherein if all of said plurality of disk units are in an accessible state, said second writing means divides said write data into sector data blocks across said plurality of disk units, generates new parity data for said sector data blocks at said same sector level, and subsequently sequentially extracts said sector data blocks and said new parity data from said same sector level, and then writes said sector data blocks into said plurality of disk units in parallel.

9. A disk array system according to claim 8, wherein said second writing means writes said sector data blocks and a generated parity data block in parallel in a plurality of disk units provided as a first rank, and said first writing means individually accesses a plurality of disk units in a second rank to write said sector data blocks and said generated parity data block, which have been read out after having been written therein.

10. A disk array system according to any one of claims 8 or 9, wherein when said first writing means or said second writing means writes to the plurality of disk units, said generated parity data block is written into the plurality of disk units in a distributed manner.

11. A disk array system according to any one of claims 8 or 9, wherein when said first writing means or said second writing means writes to the plurality of disk units, said generated parity data block is written in a dedicated disk unit.

12. A disk array system according to any one of claims 8 or 9 wherein said first writing means generates a new parity data block by calculating the exclusive-OR of sector data blocks and a parity data block read from said disk units, and said second writing means generates a new parity data block by calculating the exclusive-OR of a plurality of said sector data blocks to be written across said plurality of disk units.

13. A disk array system comprising:

a disk array means in which a plurality of disk units are connected to a corresponding plurality of access ports to define a rank, said disk array means including at least two ranks, wherein a plurality of sector data blocks are obtained by dividing write data from an upper apparatus into predetermined lengths and said plurality of sector data blocks are stored in the same sector level of said plurality of disk units, further wherein a plurality of parity data blocks are generated from said sector data blocks, and whereby every sector position in said plurality of disk units in each of said ranks stores either one of said sector data blocks or one of said parity data blocks;

a first writing means selectively operating when a data amount of the write data from said upper apparatus is less than or equal to a specified value, said first writing means for dividing said write data into a plurality of sector data blocks according to a RAID 5 format, for generating new parity data, and, subsequently, for respectively individually writing said sector data blocks and parity data into said corresponding disk unit; and a second writing means selectively operating when a data amount of the write data from said upper apparatus is greater than said specified value, wherein a mode of operation of said second writing means operating depends on whether each of said plurality of disk units is in a busy state or an accessible state;

wherein if at least one of said plurality of disk units is in a busy state, said second writing means divides said write data into sector data blocks according to a RAID 3 format, generates new parity data, and subsequently individually writes said sector data blocks into said plurality of disk units in a RAID 5 storage format;

wherein if all of said plurality of disk units are in an accessible state, said second writing means divides said write data into sector data blocks according to a RAID 3 storage format, generates new parity data, and subsequently writes in parallel into said plurality of disk units in accordance with a RAID 3 storage format.

14. A disk array system comprising:

a disk array means in which a plurality of disk units are connected to a corresponding plurality of access ports to define a rank, said disk array means including at least two ranks, wherein a plurality of sector data blocks are obtained by dividing write data from an upper apparatus into predetermined lengths and said plurality of sector data blocks are stored in the same sector level of said plurality of disk units, further wherein a plurality of parity data blocks are generated from said sector data blocks, and whereby every sector position in said plurality of disk units in each of said ranks stores either one of said sector data blocks or one of said parity data blocks;

a first writing means selectively operating when a data amount of the write data from said upper apparatus is less than or equal to a specified value, said first writing means for dividing said write data into a plurality of sector data blocks according to a RAID 4 format, for generating new parity data, and, subsequently, for respectively individually writing said sector data blocks and parity data into each of said corresponding disk units; and a second writing means selectively operating when a data amount of the write data from said upper apparatus is greater than said specified value, wherein a mode of operation of said second writing means operating depends on whether each of said plurality of disk units is in a busy state or an accessible state;

wherein if at least one of said plurality of disk units is in a busy state, said second writing means divides said write data into sector data blocks according to a RAID 3 format, generates new parity data, and subsequently individually writes said sector data blocks into said plurality of disk units in a RAID 4 storage format;

wherein if all of said plurality of disk units are in an accessible state, said second writing means divides said write data into sector data blocks according to a RAID 3 storage format, generates new parity data, and subsequently writes in parallel into said plurality of disk units in accordance with a RAID 3 storage format.

15. A system according to claim 14, wherein said second writing means writes said plurality of sector data blocks and said parity data, in parallel, into a plurality of disk units provided in another rank in accordance with a RAID 3 storage format, and after writing said sector data blocks, reads out said data, and further wherein said plurality of disk units of an inherent rank are individually accessed by said first writing means and said data is rewritten according to a RAID 4 storage format.

16. A system according to claim 14, wherein said second writing means writes said plurality of sector data blocks and said parity data, in parallel, into a plurality of disk units provided in another rank in accordance with a RAID 3 storage format, and after writing said sector data blocks, reads out said data, and further wherein said plurality of disk units of an inherent rank are individually accessed by said first writing means and said data is rewritten according to a RAID 5 storage format.

* * * * *

UNITED STATES PATENT AND TRADEMARK OFFICE
CERTIFICATE OF CORRECTION

PATENT NO. : 5,696,933
DATED : December 9, 1997
INVENTOR(S) : Itoh et al.

It is certified that error appears in the above-identified patent and that said Letters Patent is hereby corrected as shown below:

Title page, item Under "[75] Inventors:" delete "Mikio Itoh, Tomoyuki Suganuma, Suijin Takeda, Hirofumi Morita, all" and insert --Mikio Itoh-- therefor Column 4, line 36, delete "having" and insert --saving-- therefor Column 5, line 33, delete "released" and insert --released,-- therefor Column 5, line 35, delete "released" and insert --released,-- therefor

UNITED STATES PATENT AND TRADEMARK OFFICE
CERTIFICATE OF CORRECTION

PATENT NO. : 5,696,933
DATED : December 9, 1997
INVENTOR(S) : Itoh et al.

It is certified that error appears in the above-identified patent and that said Letters Patent is hereby corrected as shown below:

Column 6, line 11, delete "3-29" and insert --32-9-- therefor

Column 16, line 33, delete "29" and insert --20-- therefor

Column 18, line 44, delete "parity" and insert --parity- -- therefor

Column 18, line 58, delete "S5" and insert --S6-- therefor

Column 18, line 66, delete "terminated;" and insert --terminated,-- therefor

UNITED STATES PATENT AND TRADEMARK OFFICE
CERTIFICATE OF CORRECTION

PATENT NO. : 5,696,933
DATED : December 9, 1997
INVENTOR(S) : Itoh et al.

It is certified that error appears in the above-identified patent and that said Letters Patent is hereby corrected as shown below:

Column 22, line 35, delete "since-the" and insert --since the-- therefor

Column 27, line 22, delete "in the direction in which" and insert --across-- therefor Column 27, line 23, delete "are lined up"

Signed and Sealed this

Twenty-ninth Day of December, 1998

Attest:

BRUCE LEHMAN

*Attesting Officer*  *Commissioner of Patents and Trademarks*